US009134471B2

(12) United States Patent
Johnston et al.

(10) Patent No.: US 9,134,471 B2
(45) Date of Patent: Sep. 15, 2015

(54) ORIENTED POLYMERIC ARTICLES AND METHOD

(75) Inventors: Raymond P. Johnston, Lake Elmo, MN (US); Thomas I. Insley, Lake Elmo, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 2320 days.

(21) Appl. No.: 11/427,149

(22) Filed: Jun. 28, 2006

(65) Prior Publication Data

US 2008/0014410 A1 Jan. 17, 2008

(51) Int. Cl.
*B29C 59/00* (2006.01)
*G02B 5/30* (2006.01)
(Continued)

(52) U.S. Cl.
CPC . *G02B 5/30* (2013.01); *B29C 33/62* (2013.01); *B29C 43/222* (2013.01); *C08J 5/18* (2013.01); *D01D 5/423* (2013.01); *B29C 59/04* (2013.01); *B29K 2067/00* (2013.01); *C08J 2323/12* (2013.01); *C08J 2367/02* (2013.01); *Y10T 428/2457* (2015.01); *Y10T 428/24355* (2015.01); *Y10T 428/249953* (2015.04); *Y10T 428/249986* (2015.04); *Y10T 428/2973* (2015.01); *Y10T 428/2978* (2015.01)

(58) Field of Classification Search
USPC ........ 264/1.34, 1.36, 1.6, 435, 436, 464, 465, 264/466, 469, 479, 483, 484, 108, 138, 146, 264/147, 148, 151, 164, 167, 212, 214, 299, 264/310
See application file for complete search history.

(56) References Cited

U.S. PATENT DOCUMENTS

| | | | |
|---|---|---|---|
| 2,618,012 | A | 11/1952 | Milne |
| 2,988,772 | A | 6/1961 | Horn |

(Continued)

FOREIGN PATENT DOCUMENTS

| | | |
|---|---|---|
| CA | 2191072 | 10/1996 |
| DE | 10064520 | 7/2002 |

(Continued)

OTHER PUBLICATIONS

Davis, Jeffrey A. et al Polarization Beam Splitters Using Polarization Diffraction Gratings, OPTICS LETTERS, vol. 26, No. 9, pp. 587-589, May 1, 2001.

(Continued)

*Primary Examiner* — Ryan Ochylski
(74) *Attorney, Agent, or Firm* — Karl G. Hanson; Lance L. Vietzke; James A. Baker

(57) ABSTRACT

Stretched articles, such as oriented polymeric films or fibers, having microstructure features on at least one surface thereof, and processes for making such articles, are disclosed. A method of making fibers comprises forming a polymeric film having a body having a first surface and a second surface and having a longitudinal dimension. The film also comprises a plurality of elongate microstructure features disposed on the first surface of the body in a direction substantially parallel to the longitudinal dimension of the body, wherein the elongate microstructure features are substantially parallel. The method further comprises stretching the polymeric film in a direction substantially parallel to the longitudinal dimension of the body, and fibrillating the stretched polymeric film along the longitudinal dimension of the body to provide one or more fibers, wherein each fiber has at least one microstructure feature thereon.

38 Claims, 10 Drawing Sheets

125
125
125

(51) Int. Cl.

| | |
|---|---|
| ***B29C 33/62*** | (2006.01) |
| ***B29C 43/22*** | (2006.01) |
| ***C08J 5/18*** | (2006.01) |
| ***D01D 5/42*** | (2006.01) |
| *B29C 59/04* | (2006.01) |
| *B29K 67/00* | (2006.01) |

(56) References Cited

U.S. PATENT DOCUMENTS 3,213,753 A 10/1965 Rogers
3,357,773 A 12/1967 Rowland
3,441,638 A 4/1969 Patchell
3,502,766 A 3/1970 Motohiro et al.
3,528,723 A 9/1970 Rogers
3,594,457 A 7/1971 Wright
3,635,631 A 1/1972 Fields
3,807,004 A 4/1974 Andersen
3,832,267 A 8/1974 Liu
3,842,152 A 10/1974 Wiffield et al.
3,871,947 A 3/1975 Brekken
3,890,421 A 6/1975 Habozit
3,911,479 A 10/1975 Sakurai
3,956,450 A 5/1976 Abe et al.
3,998,916 A 12/1976 van Turnhout
4,062,918 A 12/1977 Nakanose
4,178,157 A * 12/1979 van Turnhout et al. ........... 96/99
RE30,782 E 10/1981 van Turnhout
4,330,499 A 5/1982 von und zu Aufsess et al.
4,349,500 A 9/1982 Yazawa et al.
4,434,128 A 2/1984 Okada et al.
4,434,199 A 2/1984 Fair et al.
4,446,305 A 5/1984 Rogers et al.
4,520,189 A 5/1985 Rogers et al.
4,521,588 A 6/1985 Rogers et al.
4,525,317 A 6/1985 Rogers et al.
4,525,413 A 6/1985 Rogers et al.
4,539,256 A 9/1985 Shipman
4,582,885 A 4/1986 Barber
RE32,171 E 6/1986 van Turnhout
4,601,861 A 7/1986 Pricone
4,734,335 A 3/1988 Monzer
4,770,490 A 9/1988 Gruenewald et al.
4,799,131 A 1/1989 Aho et al.
4,799,137 A 1/1989 Aho
4,810,381 A 3/1989 Hagen et al.
4,824,718 A 4/1989 Hwang
4,853,602 A 8/1989 Hommes et al.
4,862,564 A 9/1989 Kwack
4,867,881 A 9/1989 Kinzer
4,886,713 A 12/1989 Ostermann et al.
5,056,030 A 10/1991 Tomita
5,056,892 A 10/1991 Cobb
5,108,814 A 4/1992 Harp et al.
5,175,030 A 12/1992 Lu et al.
5,246,637 A * 9/1993 Matsuura et al. ............. 264/436
5,385,769 A 1/1995 Wick
5,555,129 A 9/1996 Konno
5,614,286 A 10/1997 Meyers
5,701,005 A 12/1997 Meyers
5,731,886 A 3/1998 Taber
5,737,125 A 4/1998 Ohashi
5,771,328 A 6/1998 Wortman
5,776,343 A 7/1998 Cullen
5,792,411 A 8/1998 Morris
5,820,779 A 10/1998 Shouji
5,826,314 A 10/1998 Aihara et al.
5,882,774 A 3/1999 Jonza et al.
5,900,977 A 5/1999 Hikmet
5,905,826 A 5/1999 Benson, Jr.
5,919,551 A 7/1999 Cobb
5,936,773 A 8/1999 Togino
5,962,114 A 10/1999 Jonza et al.
5,965,247 A 10/1999 Jonza et al.
6,048,614 A * 4/2000 Rohrbach et al. ............. 428/372
6,075,581 A 6/2000 Shirochi
6,096,247 A 8/2000 Ulsh et al.
6,111,696 A 8/2000 Allen
6,247,986 B1 6/2001 Chiu
6,256,146 B1 7/2001 Merrill et al.
6,278,552 B1 8/2001 Ishihara
6,280,824 B1 8/2001 Insley et al.
6,358,457 B1 3/2002 Wong et al.
6,366,335 B1 4/2002 Hikmet
6,376,065 B1 4/2002 Korba
6,432,347 B1 * 8/2002 Perez et al. .................. 264/444
6,461,003 B1 10/2002 Neudeck
6,524,360 B2 * 2/2003 Cox et al. ........................ 55/382
6,560,026 B2 5/2003 Gardiner
6,586,073 B2 * 7/2003 Perez et al. .................. 428/141
6,609,795 B2 8/2003 Weber et al.
6,616,887 B2 9/2003 Chiu et al.
6,621,533 B2 9/2003 Slack
6,641,767 B2 11/2003 Zhang
6,645,618 B2 * 11/2003 Hobbs et al. ................. 428/359
6,646,802 B2 11/2003 Yamamoto
6,692,823 B2 2/2004 Kody et al.
6,700,695 B2 3/2004 Engler
6,743,464 B1 * 6/2004 Insley et al. .................. 427/121
6,783,574 B1 * 8/2004 Angadjivand et al. ............ 96/15
6,788,463 B2 9/2004 Merrill et al.
6,808,658 B2 10/2004 Stover
6,811,274 B2 11/2004 Olczak
6,939,499 B2 9/2005 Merrill et al.
6,963,448 B1 11/2005 Hayakawa
2001/0036546 A1 11/2001 Kaytor
2001/0040731 A1 11/2001 Bacon
2002/0034610 A1 * 3/2002 Perez et al. .................. 428/141
2002/0054258 A1 5/2002 Kondo
2002/0154406 A1 10/2002 Merrill et al.
2002/0158574 A1 10/2002 Wolk et al.
2003/0058383 A1 3/2003 Jagt
2003/0067091 A1 4/2003 Krumm
2003/0071947 A1 4/2003 Shiraogawa
2003/0214728 A1 11/2003 Olczak
2003/0215611 A1 * 11/2003 Seth et al. .................... 428/169
2004/0005451 A1 1/2004 Kretman
2004/0011204 A1 * 1/2004 Both ................................ 96/66
2004/0051948 A1 3/2004 Reed
2004/0116033 A1 6/2004 Ouderkirk
2004/0130057 A1 7/2004 Mehrabi
2004/0142150 A1 7/2004 Bharadwaj
2004/0189908 A1 9/2004 Kawamoto
2004/0233526 A1 11/2004 Kaminsky
2004/0234724 A1 11/2004 Kaminsky
2004/0240777 A1 12/2004 Woodgate
2005/0059766 A1 3/2005 Jones
2006/0138686 A1 * 6/2006 Ouderkirk et al. ............. 264/2.7
2006/0138694 A1 6/2006 Biernath
2006/0138702 A1 6/2006 Biernath
2006/0139476 A1 6/2006 Sasaki
2006/0141218 A1 6/2006 Biernath
2006/0141219 A1 6/2006 Biernath
2006/0141220 A1 6/2006 Merrill
2006/0170808 A1 8/2006 Biernath
2006/0204720 A1 9/2006 Biernath
2007/0013103 A1 1/2007 Zhang
2007/0065636 A1 3/2007 Merrill

FOREIGN PATENT DOCUMENTS

| | | |
|---|---|---|
| EP | 0698804 | 2/1996 |
| EP | 0736782 | 10/1996 |
| EP | 0769879 | 4/1997 |
| EP | 1104181 | 5/2001 |
| EP | 1223460 | 7/2002 |
| EP | 1408349 | 4/2004 |
| EP | 1498770 | 1/2005 |
| GB | 1526722 | 9/1978 |
| GB | 1526723 | 9/1978 |
| GB | 1526724 | 9/1978 |
| JP | 57-131530 | 11/1982 |
| JP | 58-045928 | 6/1983 |
| JP | 59-120424 | 11/1984 |

(56) References Cited

FOREIGN PATENT DOCUMENTS

| | | | |
|---|---|---|---|
| JP | 63-287921 | | 11/1988 |
| JP | Hei 05-011113 | | 1/1993 |
| JP | Hei 05-011114 | | 1/1993 |
| JP | Hei 05-241021 | | 9/1993 |
| JP | Hei 05-288931 | | 11/1993 |
| JP | Hei 05-288932 | | 11/1993 |
| JP | Hei 06-027321 | | 2/1994 |
| JP | Hei 06-034815 | | 2/1994 |
| JP | Hei 06-051116 | | 2/1994 |
| JP | Hei 06-051119 | | 2/1994 |
| JP | 06-175073 | | 6/1994 |
| JP | 11-344604 | | 12/1999 |
| JP | 2002-090527 | | 3/2002 |
| JP | 2003-207628 | | 7/2003 |
| JP | 2006-072112 | | 3/2008 |
| WO | WO 92/11996 | | 7/1992 |
| WO | 96/32529 | | 10/1996 |
| WO | WO 97/39369 | | 10/1997 |
| WO | WO 98/39755 | | 9/1998 |
| WO | WO 99/37626 | | 7/1999 |
| WO | 00/29197 | | 5/2000 |
| WO | WO 00/68301 | | 11/2000 |
| WO | WO 01/27663 | | 4/2001 |
| WO | WO 02/04858 | | 1/2002 |
| WO | 02/096622 | A1 | 12/2002 |
| WO | WO 02/096621 | | 12/2002 |
| WO | WO 03/041817 | | 5/2003 |
| WO | WO 03/101698 | | 12/2003 |
| WO | WO 2004/025604 | A2 | 3/2004 |
| WO | WO 2004/039551 | | 5/2004 |
| WO | WO 2004/051705 | | 6/2004 |
| WO | 2004/062904 | A1 | 7/2004 |
| WO | WO 2004/062904 | | 7/2004 |
| WO | WO 2004/079414 | | 9/2004 |
| WO | WO 2006/071616 | | 7/2006 |
| WO | WO 2006/107621 | | 10/2006 |

OTHER PUBLICATIONS

Biernath et al, U.S. Appl. No. 11/050,616.

Henri J.B. Jagt et al., "Micro-structured Polymeric Linearly Polarized Light Emitting Lightguide for LCD Illumination", Society for Image Display Symposium Digest of Technical Papers, May 2002, pp. 1236-1239.

Toshitaka Kanai and Gregory Campbell (editors), "Film Processing", Chapters 1, 2, 3 and 6, Hanser Publishers, 1999.

Orville J Sweeting (editor), "The Science and Technology of Polymer Films, vol. 1", pp. not all pages provided 471-479, John Wiley and Sons, 1968.

Supplemental Search Report for Application No. EP07798796 dated Jan. 10, 2012.

* cited by examiner

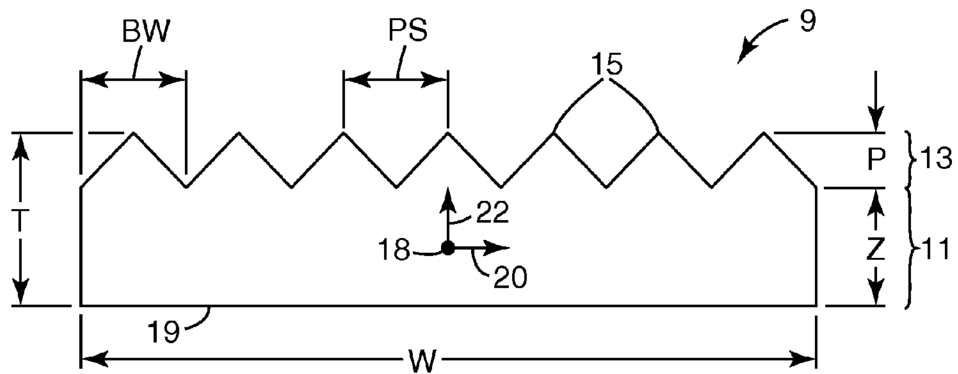
Fig. 1
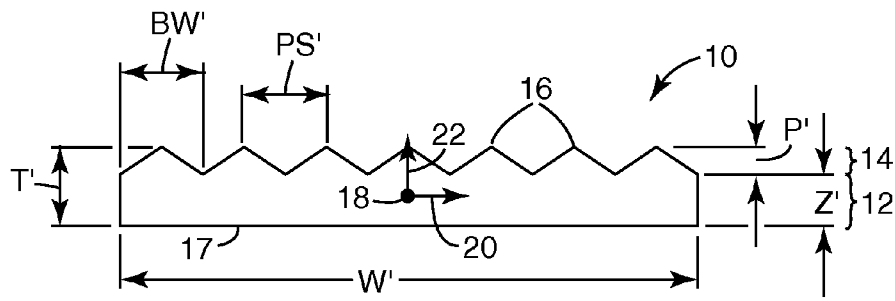
Fig. 2
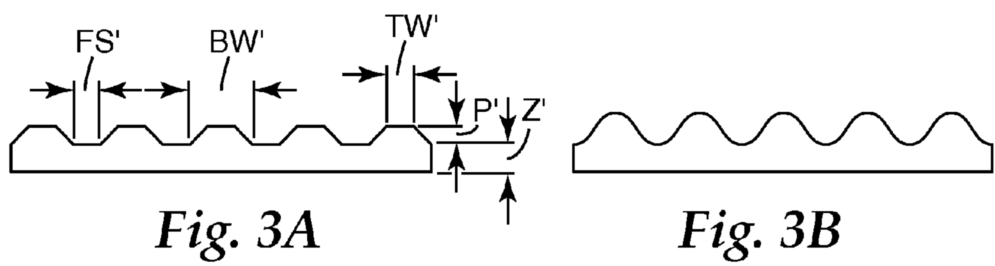
Fig. 3A
Fig. 3B
Fig. 3C
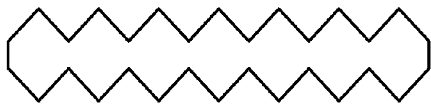
Fig. 3D

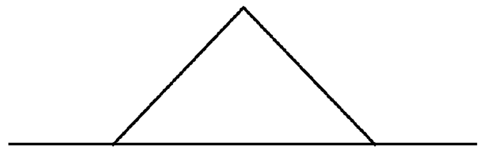
Fig. 4A
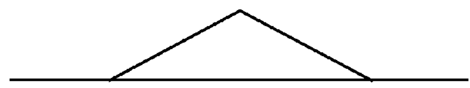
Fig. 4B
Fig. 4C
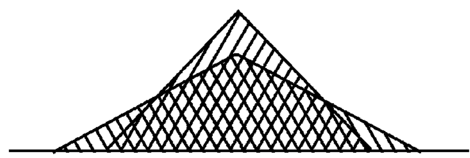
Fig. 4D
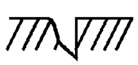
Fig. 5A Fig. 5B Fig. 5C Fig. 5D Fig. 5E
Fig. 5F Fig. 5G Fig. 5H Fig. 5I
Fig. 5J Fig. 5K Fig. 5L Fig. 5M Fig. 5N
Fig. 5O Fig. 5P Fig. 5Q Fig. 5R Fig. 5S
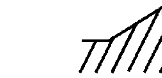
Fig. 5T Fig. 5U Fig. 5V Fig. 5W

ORIENTED POLYMERIC ARTICLES AND METHOD

TECHNICAL FIELD

The present invention relates to stretched articles, such as oriented polymeric films and fibers, having structured surfaces, and to processes for making and using such articles.

BACKGROUND

Articles having structured surfaces, and processes for providing such articles are known. In the case of optical articles, see, for example, U.S. Pat. Nos. 6,096,247 and 6,808,658, and published application U.S. 2002/0154406 A1. The structured surfaces disclosed in these references include microprisms (such as microcubes) and lenses. Typically these structures are created on the surface of a suitable polymer by, for example, embossing, extrusion or machining.

The manufacture of such articles often comprises a step in which a tool bearing a negative version of the desired structured surface is contacted with a polymer resin. Contact with the resin is maintained for a time and under conditions adequate to fill the cavities in the tool after which the resin is removed from the tool. The resulting structured surface is a replicate of the negative surface of the tool.

Birefringent articles having structured surfaces are also known. See, for example, U.S. Pat. Nos. 3,213,753; 4,446, 305; 4,520,189; 4,521,588; 4,525,413; 4,799,131; 5,056,030; 5,175,030 and published applications WO 2003/0058383 A1 and WO 2004/062904 A1.

Processes for manufacturing stretched films are also known. Such processes are typically employed to improve the mechanical and physical properties of the film. These processes include biaxial stretching techniques and uniaxial stretching techniques. See for example PCT WO 00/29197, U.S. Pat. Nos. 2,618,012; 2,988,772; 3,502,766; 3,807,004; 3,890,421; 4,330,499; 4,434,128; 4,349,500; 4,525,317 and 4,853,602. See also U.S. Pat. Nos. 4,862,564; 5,826,314; 5,882,774; 5,962,114 and 5,965,247. See also Japanese Unexamined Patent Publications Hei 5-11114; 5-288931; 5-288932; 6-27321 and 6-34815. Still other Japanese Unexamined Applications that disclose processes for stretching films include Hei 5-241021; 6-51116; 6-51119; and 5-11113. See also WO 2002/096622 A1.

SUMMARY

One aspect of the invention comprises a method of making fibers comprising forming a polymeric film having a body having a first surface and a second surface and having a longitudinal dimension. The film comprises a plurality of elongate microstructure features disposed on the first surface of the body in a direction substantially parallel to the longitudinal dimension of the body, wherein the microstructure features are substantially parallel. The method also comprises stretching the polymeric film in a direction substantially parallel to the longitudinal dimension of the body, and separating the stretched polymeric film along generally longitudinally disposed separation lines to define a plurality of discrete fiber elements, wherein one or more of the fiber elements have at least one microstructure feature thereon.

In another aspect, the invention comprises a method of making fibers comprising forming a polymeric film having a body having a first surface and a second surface and having a longitudinal dimension. The film also comprises a plurality of elongate microstructure features disposed on the first surface of the body in a direction substantially parallel to the longitudinal dimension of the body, wherein the elongate microstructure features are substantially parallel. The method further comprises stretching the polymeric film in a direction substantially parallel to the longitudinal dimension of the body, and fibrillating the stretched polymeric film along the longitudinal dimension of the body to provide one or more fibers, wherein each fiber has at least one microstructure feature thereon.

In one embodiment, the present invention is a polymeric film comprising a body having a first surface and a second surface, a first thickness and a longitudinal dimension. The film also comprises a plurality of elongate microstructure features disposed on the first surface of the body in a direction substantially parallel to the longitudinal dimension of the body, wherein the elongate microstructure features are substantially parallel and have a second thickness. The film has a stretch ratio of at least 1.5 in the longitudinal dimension of the body, and the ratio of the first thickness of the body to the second thickness of the microstructure features is at most 2.

In yet another embodiment, the present invention is a polymeric fiber comprising a fiber body having a first surface and a second surface, and a longitudinal dimension. The fiber also comprises one or more elongate microstructure features disposed on the first surface of the fiber body in a direction substantially parallel to the longitudinal dimension of the fiber body, wherein any plurality of microstructure features are substantially parallel.

This summary is not intended to describe each disclosed embodiment or every implementation of the present invention. Many other novel advantages, features, and relationships will become apparent as this description proceeds. The figures and the description that follow more particularly exemplify illustrative embodiments.

BRIEF DESCRIPTION OF THE DRAWINGS

The invention may be more completely understood in the following detailed description of various embodiments of the invention in connection with the accompanying drawings, in which:

FIG. 1 is a sectional view of a precursor film useful in the present invention.

FIG. 2 is a sectional view of one embodiment film of the present invention.

FIGS. 3A-3D are sectional views of some alternative embodiments of the film of the present invention.

FIGS. 4A-4D are illustrations useful in determining how to calculate the shape retention parameter (SRP).

FIGS. 5A-5W illustrate sectional views of some alternative profiles of geometric features useful in the present invention.

Figure 6:
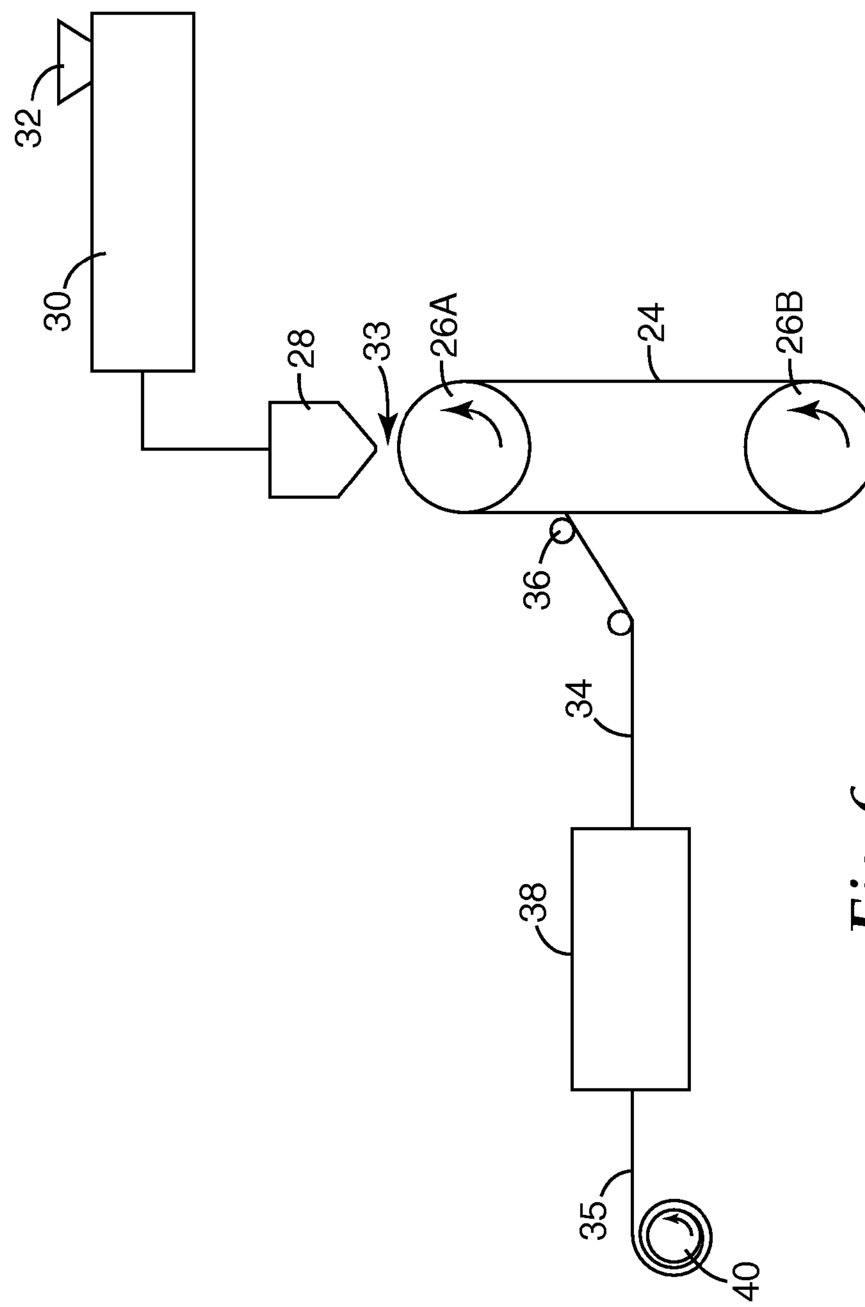
FIG. 6 is a schematic representation of a process according to the present invention.

The invention is amenable to various modifications and alternative forms. Specifics of the invention are shown in the drawings by way of example only. The intention is not to limit the invention to the particular embodiments described. Instead, the intention is to cover all modifications, equivalents, and alternatives falling within the spirit and scope of the invention.

Glossary

As used herein, the following terms and phrases have the following meaning.

"Cross sectional shape", and obvious variations thereof, means the configuration of the periphery of the geometric feature defined by the second in-plane axis and the third axis. The cross sectional shape of the geometric feature is independent of is physical dimension and presence of defects or irregularities in the feature.

"Stretch ratio", and obvious variations thereof, means the ratio of the distance between two points separated along a direction of stretch after stretching to the distance between the corresponding points prior to stretching.

"Geometric feature", "feature" and obvious variations thereof, means the predetermined shape or shapes present on the structured surface.

"Elongate" means extending along a length orientation of a film or fiber body.

"Micro" is used as a prefix and means that the term that it modifies has a cross-sectional profile that has a height of 1 mm or less. In one embodiment, the cross-sectional profile has a height of 0.5 mm or less. In another embodiment, the cross-sectional profile has a height of 0.05 mm or less.

"Uniaxial stretch", including obvious variations thereof, means the act of grasping opposite edges of an article and physically stretching the article in only one direction. Uniaxial stretch is intended to include slight imperfections in uniform stretching of the film due to, for example, shear effects that can induce momentary or relatively very small biaxial stretching in portions of the film.

"Structure surface" means a surface that has at least one geometric feature thereon.

"Structured surface" means a surface that has been created by any technique that imparts a desired geometric feature or plurality of geometric features to a surface.

"Electret" means a material that exhibits a quasi-permanent electric charge.

"Metallic surface" and obvious variations thereof means a surface coated or formed from a metal or a metal alloy which may also contain a metalloid. "Metal" refers to an element such as iron, gold, aluminum, etc., generally characterized by ductility, malleability, luster, and conductivity of heat and electricity which forms a base with the hydroxyl radical and can replace the hydrogen atom of an acid to form a salt. "Metalloid" refers to nonmetallic elements having some of the properties of a metal and/or forming an alloy with metal (for example, semiconductors) and also includes nonmetallic elements which contain metal and/or metalloid dopants.

"True uniaxial orientation", and obvious variations thereof means a state of uniaxial orientation (see below) in which the orientation sensitive properties measured along the second in-plane axis and the third axis are substantially equal and differ substantially from the orientation sensitive properties along the first in-plane axis.

Real physical systems generally do not have properties which are precisely and exactly identical along the second in-plane axis and the third axis. The term "true uniaxial orientation" is used herein to refer to a state of orientation in which orientation-sensitive properties of the film measured along these axes differ only by a minor amount. It will be understood that the permissible amount of variation will vary with the intended application. Often, the uniformity of such films is more important than the precise degree of uniaxial orientation. This situation is sometimes referred to in the art as "fiber symmetry", because it can result when a long, thin, cylindrical fiber is stretched along its fiber axis.

"True uniaxial stretch" and obvious variations thereof, means the act of providing uniaxial stretch (see above) in such a manner that the stretch ratios along the second in-plane axis and the third axis are substantially identical to each other but substantially different from the stretch ratio along the first in-plane axis.

"Uniaxial orientation", including obvious variations thereof, means that an article has a state of orientation in which orientation sensitive properties of the article measured along the first in-plane axis, i.e., the axis substantially parallel to the uniaxial stretching direction, differ from those measured along the second in-plane axis and the third axis. Though a wide variety of properties may be measured to determine the presence of uniaxial orientation, crystal orientation and morphology are the properties of interest herein unless another is specified. Other illustrative examples of such properties include the refractive index, thermal and hygroscopic expansions, the small strain anisotropic mechanical compliances, tear resistance, creep resistance, shrinkage, the refractive indices and absorption coefficients at various wavelengths.

In the case of layered films, "uniaxial" or "truly uniaxial" are intended to apply to individual layers of the film unless otherwise specified.

DETAILED DESCRIPTION

The present invention is directed to methods for structured orienting films and fibers, and the articles made thereby.

Many of the embodiments disclosed herein are directed to the optical characteristics of such oriented articles and the related processes. However, the invention has significant utility beyond optical applications, as is set forth in a number of alternative embodiments disclosed herein.

The present invention provides a film having a structured surface, articles made therefrom, and a novel process for the manufacture thereof. The structured surface comprises at least one geometric feature having a desired cross-sectional shape. One embodiment of the article of the invention comprises a film having the structured surface. One aspect of the invention comprises an article that has a uniaxial orientation throughout its thickness. The structured surface comprises a plurality of geometric features. The geometric feature or features are elongate. The feature or features are substantially aligned with a first in-plane axis of the article. The article of the invention comprises a land, or body, portion having a structured surface thereon. The article may comprise a single layer or a plurality of separate layers. The article of the invention may have a structured surface on opposing sides thereof. The layers may comprise different polymeric materials. The article may be positively or negatively birefringent, electret, crystalline, hydrophilic, hydrophobic, microporous and/or have other desired characteristics.

One embodiment of the article of the invention comprises a uniaxially oriented structured surface polymeric film comprising:

(a) a polymeric body having (i) a first and a second surface, and (ii) first and second in-plane axes that are orthogonal with respect to each other and a third axis that is mutually orthogonal to the first and second in-plane axis in a thickness direction of the polymeric film; and (b) an elongate geometric feature disposed on the first surface of the polymeric body in a direction substantially parallel to the first in-plane axis of the polymeric film;

wherein the film has a shape retention parameter (SRP) of at least 0.1.

The present invention also provides a roll of uniaxially oriented structured surface article comprising:

(a) a polymeric body having (i) a first and a second surface, and (ii) first and second in-plane axes that are orthogonal with respect to each other and a third axis that is mutually orthogonal to the first and second in-plane axis in a thickness direction of the polymeric film; and (b) a surface portion comprising an elongate geometric feature disposed on the on the first surface of the polymeric body, the linear geometric feature being disposed on the body in a direction substantially parallel to the first in-plane axis of the polymeric film.

In another aspect of the invention, the roll as described above comprises a polymeric film that is uniaxially oriented along the first in-plane axis. In yet another aspect, the roll as described above further comprises a cushioning layer between individual wraps of the roll. The cushioning layer aids in protecting the structured surface from damage and/or distortion during manufacture, storage and shipping.

In yet another aspect of the invention, the article has a first refractive index ($n_1$) along the first in-plane axis, a second refractive index ($n_2$) along the second in-plane axis and a third refractive index ($n_3$) along the third in-plane axis. In the present invention, $n_1 \neq$ to each of $n_2$ and $n_3$. That is, $n_1$ may be greater than $n_2$ and $n_3$ or it may be less than $n_2$ and $n_3$. In one embodiment, $n_2$ and $n_3$ are substantially equal to one another. The relative birefringence of the film of the invention is, in one embodiment, 0.3 or less.

The present invention may also comprise a multi-phase film. In this embodiment, the film may comprise a multi-component phase separating system or one in which one component is dissolved in another to create either a porous structure or very small particles in a continuous matrix or a bi-continuous matrix.

The present invention may also incorporate an additional layer over either the microstructured surface or the second surface. It may also incorporate additional layers on either or both of such surfaces. The additional layer can be added before or after stretching. If the additional layer is added before stretching, it should be capable of being stretched. Examples of such layers include, but are not limited to, anti-reflective layers, index-matching layers and protective layers.

Truly uniaxial stretching is particularly useful when an additional layer is employed. In this case, for example, stress build-up in the cross direction is minimized so that factors of adhesion between the layers is a less critical feature.

In another aspect, the present invention comprises a roll of microstructure film with predetermined properties defined in reference to a coordinate system of first and second orthogonal in-plane axes and a third mutually orthogonal axis in a thickness direction of the film. For example, the geometric features can be aligned with the direction of wrap of the roll (i.e., along the machine direction (MD)) or they may be aligned transverse to the direction of wrap of the roll (i.e., along the cross direction (TD)). Alternatively, the geometric structures may be aligned at any desired angle to the MD or TD directions.

The present invention further comprises a method of making a structured surface film. One aspect, the method of the invention comprises the steps of:

(a) providing a polymeric film having (i) a first surface comprising a desired geometric feature; and a second surface, and (ii) first and second in-plane axes that are orthogonal with respect to each other and a third axis that is mutually orthogonal to the first and second in-plane axis in a thickness direction of the polymeric film and subsequently (b) stretching the polymeric film in a direction substantially parallel to the first in-plane axis of the polymeric film;

wherein the cross sectional shape of the geometric feature before step (b) is substantially retained after step (b).

In another aspect, the invention comprises a method of making a structured surface film that comprises the steps of:

(a) providing a polymeric film having (i) a first structured surface and a second surface, and (ii) first and second in-plane axes that are orthogonal with respect to each other and a third axis that is mutually orthogonal to the first and second in-plane axis in a thickness direction of the polymeric film, wherein the first structured surface has a geometric feature disposed thereon in a direction substantially parallel to the first in-plane axis; and subsequently (b) uniaxially orienting the polymeric film in a direction substantially parallel to the first in-plane axis of the polymeric film.

Yet another aspect the invention comprises a method of making a structured surface film that comprises the steps of:

(a) providing a tool that comprises a negative of a desired structured surface;

(b) contacting the tool with a resin to create the desired surface, the desired structure surface comprising a geometric feature;

(c) optionally, solidifying the resin to form a film having (i) the desired structured surface and an opposed surface, and (ii) first and second in-plane axes that are orthogonal with respect to each other and a third axis that is mutually orthogonal to the first and second in-plane axis in a thickness direction of the film;

(d) removing the film from the tool; and subsequently (e) stretching the polymeric film in a direction substantially parallel to the first in-plane axis of the polymeric film.

Another embodiment of the invention comprises a method of making a desired microstructure surface film having a plurality of elongate geometric micro-features. The method comprising the steps of:

(a) providing a tool comprising a negative version of the desired microstructure surface;

(b) providing a molten polymeric resin to a gap formed between the master tool and a second surface;

(c) forming a polymeric film having the desired microstructure surface in the gap, the film having (i) first and second in-plane axes that are mutually orthogonal with respect to each other and a third axes that is mutually orthogonal with respect to the first and second in-plane axes in a thickness direction of the film, and (ii) the desired microstructure surface having the elongate micro-features positioned in a direction substantially parallel to the first in-plane axis;

(d) removing the polymeric film of step (c) from the tool; and (e) stretching the polymeric film in a direction substantially parallel to the first in-plane axis.

In one embodiment of the method(s) of the invention, the article has a first orientation state prior to stretching and a second orientation state, different from the first orientation state, after stretching. In another embodiment, stretching provides a smaller, physical cross section (i.e., smaller geometric features).

The method(s) of the invention provide a polymeric film that is stretched, creating, for example, a film that is birefringent after stretching, and has a first index of refraction ($n_1$) along the first in-plane axis, a second index of refraction ($n_2$) along the second in-plane axis, and a third index of refraction ($n_3$) along the third axis.

In another embodiment of the invention, the method creates substantially the same proportional dimensional changes in the direction of both of the second and third in-plane axes of the film. These proportional dimensional changes in the direction of the second and third in-plane axes are substantially the same throughout the stretch or stretch history of the film.

In another embodiment, the present invention provides a method by which a wide variety of polymers can be used to replicate the negative surface of a tool. The present invention provides a method of making having a polymeric article having a desired structured surface comprising the steps of:

(a) providing a tool that comprises a negative surface of the desired structured surface;

(b) contacting the negative surface of the tool with a composition comprising a fluorochemical benzotriazole to provide a coated negative surface;

(c) contacting the coated negative surface with a resin to create the desired structured surface in the resin, the desired structured surface comprising a geometric feature; and (d) removing the resin from the tool.

The structured surface provided on the article by the process of the invention comprises a replica of the negative surface of the tool. The structured surface of the article has at least one geometric feature having a desired cross-sectional shape. One embodiment of the method of the invention comprises making a film having the structured surface. The method of the invention may be used to make unoriented and oriented articles such as films. The oriented articles may be uniaxially or biaxially oriented. The replicated structured surface made by the process of the invention may comprise a plurality of geometric features. The geometric feature or features are elongate. The feature or features may be aligned with a first in-plane axis of the article. Alternatively, they may be disposed on the article at any desired angle to the first in-plane axis. The method may be used to make articles that comprise a single layer or a plurality of separate layers. The layers may comprise different polymeric materials. The article may be positively or negatively birefringent, electret, crystalline, hydrophilic, hydrophobic, microporous and/or have other desired characteristics. Additionally, the method of the invention may be used to make articles that have a structured surface on both opposing sides thereof.

The geometric feature or features on the article and/or replicated by the process of the invention are elongate in nature and may be either a prismatic, rectangular, convex, concave, complex or lenticular geometric feature. The geometric feature or features is a microfeature and may be continuous or discontinuous along the first in-plane axis. It may have a variety of cross-sectional profiles as discussed more fully below. The geometric feature may be repeating or non-repeating on the replicated surface. The replicated surface may comprise a plurality of geometric features that have the same cross-sectional shape. Alternatively, it may have a plurality of geometric features that have different cross-sectional shapes.

In another aspect of the invention, the film as manufactured by any method of the invention is fibrillated after stretching to provide one or more uniaxially oriented fibers having a structured surface. The fibers may be created as individual fibers or as two or more fibers joined along their length to one another. In one embodiment, one or more fibers may be free of any portion of the structured surface (i.e., have no geometric features thereon).

The articles and films of the invention generally comprise a body portion and a surface structure portion. FIG. 1 represents an end view of a pre-cursor film having a first orientation state while FIG. 2 represents an end view of one embodiment of the film of the invention having a second orientation state FIGS. 3A-3D represent end views of some alternative embodiments of the invention.

Precursor film 9 comprises a body or land portion 11 having an initial thickness (Z) and a surface portion 13 having a height (P). Surface portions 13 comprises a series of parallel geometric features 15 here shown as right angle prisms. Geometric features 15 each have a base width (BW) and a peak-to-peak spacing (PS). The precursor film has a total thickness T which is equal to the sum of P+Z.

With specific reference to FIG. 2, the film of the invention 10 comprises a body or land portion 12 having a thickness (Z') and a surface portion 14 having a height (Pt). Surface portion 14 comprises a series of parallel geometric features 16 comprising prisms. Geometric features 16 each have a base width (BW') and a peak-to-peak spacing (PS'). The film of the invention has a total thickness T' which is equal to P'+Z'.

The relationship between the dimensions of the precursor film and the film of the invention are T'<T; P'<P; Z'<Z; usually BW'<BW; and PS'<PS.

Figure 9:
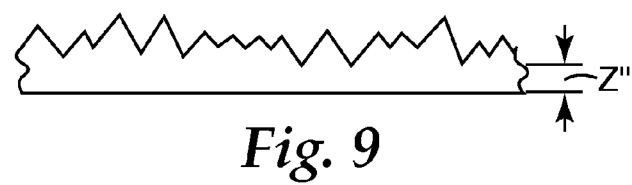
FIG. 9 is an end view of an article of the invention having a structured surface of varying cross-sectional dimensions.

Body or land portions 11, 12 comprise the portion of the article between bottom surfaces 17 and 19 and the lowest point of the surface portions 15, 16. In some cases, this may be a constant dimension across the width (W,W') of the article. In other cases, this dimension may vary due to the presence of geometric features having varying land thicknesses. See FIG. 9. In FIG. 9, the land thickness is represented by Z".

The precursor film 9 and the film of the invention 10 each have a first in-plane axis 18, a second in-plane axis 20 and a third axis 22 in the thickness direction. The first in-plane axis is substantially parallel to the direction of stretching as discussed herein after. In FIGS. 1 and 2, this axis is normal to the end of films 9 and 10. These three axes are mutually orthogonal with respect to one another.

The cross-sectional shape of at least one geometric feature of the film or article of the present invention substantially mimics the cross-sectional shape of the geometric feature of its precursor. This fidelity in shape is especially important when making optical devices where uniform redistribution of incident light is desired. This is true whether the initial cross-sectional shape of the feature comprises flat or curved surfaces. The shape retention of the article and process is determined by calculating the Shape Retention Parameter (SRP).

SRP for a given feature is determined as follows. An image is acquired of a cross-section of a film having the feature before stretching. The sectioning plane is the plane defined by the second in-plane axis 20 and the third axis 22 and is orthogonal to the direction in which the film is to be stretched. One representative example of the structural features present is chosen, and is referred to as the feature. A line is superimposed on the image at the junction of the body portion 11 and the surface portion 13. This is the Feature Baseline (FB). The area of the feature above its baseline is then calculated. This is the Unstretched Feature Area (UFA).

An image is then acquired of a cross-section of the film after stretching. The sectioning plane is the plane defined by the second in-plane axis and the third axis. If the film has been stretched by a non-continuous, or "batch" process, such as on a laboratory film stretching instrument, it will be possible to select the same feature as that selected when examining the film specimen before stretching. If the film has been stretched on a continuous film-making line, the feature should be selected from an appropriate location on the stretched film web, analogous to the location that was chosen on the unstretched web, as will be appreciated by one skilled in the film making art. A Feature Baseline (FB) is again established, and the area of the stretched film feature is then calculated. This is the Stretched Feature Area (SFA).

The ratio UFA/SFA is then calculated. This is the Image Ratio (IR). The image of the stretched film feature is then scaled up proportionately so as to have the same area as the image of the unstretched film feature. This is done by expanding the image in each of the height and width dimensions by a factor of the square root of IR. The scaled up image of the feature of the stretched film is then superimposed on the image of the feature of the unstretched film in such a way that their Feature Baselines coincide. The superimposed images are then translated with respect to one another along their common baseline, until the location is found that maximizes the area of their overlap. This and all the aforementioned and subsequent mathematical and numerical operations can be done simply on a computer with appropriately written code, as will be apparent to one skilled in the art.

The area shared by both of the superimposed images in this optimally superimposed condition is the Common Area (CA). The ratio CA/UFA is then calculated. This ratio is the Common Area Ratio (CAR). For a stretch that results in perfect shape retention, the CAR will be unity. For any deviation from perfect shape retention, the CAR will be a positive number less than unity.

For any particular film, CAR will differ from unity by an amount that depends at least on the shape of the feature, the stretch ratio, and the degree to which the stretching operation approaches a truly uniaxially orienting stretch. Other factors may also be involved. In order to quantify the degree of deviation from perfect shape retention, it is necessary to develop another parameter, the Shape Retention Parameter (SRP). The SRP is a measure which indicates proportionately where a film having a structured surface falls, on a continuum, from perfect shape retention at one extreme, to a selected reference point characteristic of typical industrial practice, at the other extreme. We have chosen as such a reference point the performance, for the same feature shape and stretch ratio, of an idealized film tenter (transverse orienter) operated efficiently in a continuous mode. The major axis of the features on the film's structured surface is assumed to be parallel to the crossweb direction, which is the stretch direction. Edge effects and all other process non-idealities are neglected, as are non-idealities of the film material itself, such as changes in density upon stretching, for example. For this ideal tenter case, then, all the transverse stretch imparted to the film is accommodated by shrinkage of the film, by the same ratio, and in the thickness dimension only. Because the hypothetical tenter is ideal, there is no shrinkage of the film in the machine or downweb direction.

Image Ratio, for a film that stretches ideally, is the same as the stretch ratio. If the Image Ratio is different from the stretch ratio, this is indicative of non-idealities in the system due to, for example, Poisson's Ratio, density changes (e.g., due to crystallization during stretch) and variations between the local stretch ratio and the nominal ideal stretch ratio.

The following will be described with reference to FIGS. 4A-4D. The calculations may easily be performed by computer using algorithms known to those skilled in the art. The calculation begins with the experimentally obtained image of the feature of the unstretched film which was used already to calculate the CAR. In FIG. 4A, the feature shown is a right triangle feature. The right triangle is shown in FIG. 4A only for illustrative purposes as the methodology detailed here is generally applicable to any feature shape, whether having or not having symmetry, and whether having straight prismatic) or curved (lenticular) surfaces. The methodology is also generally applicable to "dished" features, or features having complex shapes, such as S-shaped features, hook-shaped features, or "mushroom-cap" features.

The image of FIG. 4A is computationally converted to the image of FIG. 411 by shrinking only the height dimension by a factor of the stretch ratio used in making the film in question. This simulates what would have happened to the film surface feature in the "ideal tenter" for the feature shape and stretch ratio in question. The image is then converted from that of FIG. 4B to that of FIG. 4C by scaling it up in each of the height and width dimensions by a factor of the square root of the stretch ratio. Thus, the image of FIG. 4C has an area identical to that of the image of FIG. 4A. The images of FIG. 4A and FIG. 4C are then superimposed and translated along their common baseline until the position of maximum overlap area is found. This is shown in FIG. 4D. The common area of this FIG. (the crosshatched area which is common to both the original feature image and the computationally processed feature image) is calculated, and the ratio of this area to the area of the image of FIG. 4A is calculated. This value is the Common Area Ratio for the Ideal Tenter (CARIT), for the given feature shape and stretch ratio. It will be understood that this calculation must be done independently for each film specimen, as the CARIT is a strong function of both the unstretched feature shape and the stretch ratio employed.

Finally, SRP is calculated using the following formula:

$$SRP=(CAR-CARIT)/(1-CARIT)$$

For perfect shape retention, SRP is unity. For the case of a hypothetical film stretched on an "ideal" tenter, CAR equals CARIT, and SRP is zero. Thus, SRP is a measure which indicates proportionately where a film having a structured surface falls, on a continuum, from perfect shape retention at one extreme, to a selected reference point characteristic of typical industrial practice, at the other extreme. Films having SRP very close to 1.00 show a very high degree of shape retention. Films having SRP very close to 0.00 show a low degree of shape retention for the feature shape and stretch ratio employed. In some embodiments of the present invention, the films have an SRP of at least 0.1.

It will be understood by one skilled in the art that a film made on a standard film tenter or by other means may well have an SRP value which is less than zero, due to the many non-idealities which are possible, as discussed above. The "ideal tenter" is not meant to represent the worst possible shape retention which can result. Rather, it is a point of reference useful for comparing different films on a common scale.

In one embodiment of the present invention, a film having a structured surface has a value of SRP of about 0.1 to 1.00. In another embodiment of the present invention, a film having a structured surface has a value of SRP of about 0.5 to 1.00. In another embodiment of the present invention, a film having a structured surface has a value of SRP of about 0.7 to 1.00. In another embodiment of the present invention, a film having a structured surface has a value of SRP of about 0.9 to 1.00.

The method of the invention can be used to make a film possessing a uniaxial orientation. The uniaxial orientation may be measured by determining the difference in the index of refraction of the film along the first in-plane axis ($n_1$), the index of refraction along the second in-plane axis ($n_2$), and the index of refraction along the third axis ($n_3$). Uniaxially oriented films of the invention have $n_1 \neq n_2$ and $n_1 \neq n_3$. In one embodiment, the films of the invention are truly uniaxially oriented. That is, $n_2$ and $n_3$ are substantially equal to one another and relative to their differences with $n_1$.

In one embodiment, the method of the invention may be used to provide a film possessing a relative birefringence of 0.3 or less. In another embodiment, the relative birefringence is less than 0.2 and in yet another embodiment it is less than 0.1. Relative birefringence is an absolute value determined according to the following formula:

$$|n_2-n_3|/|n_1-(n_2+n_3)/2|$$

Relative birefringence may be measured in either the visible or the near infrared spectra. For any given measurement, the same wavelength should be used. A relative birefringence of 0.3 in any portion of either spectra is satisfactory to meet this test.

The method of the invention can be used to make films that comprise at least one prismatic or lenticular geometric feature. The geometric feature may be an elongate structure that is generally parallel to the first in-plane axis of the film. As shown in FIG. 2, the structured surface comprises a series of prisms 16. However, other geometric features and combinations thereof may be used. For example, FIG. 3A shows that the geometric features do not have to have apices nor do they need to touch each other at their bases. As shown in FIG. 3A, when a feature does not have an apice, it may have a feature top width (TW'). When the features do not touch at their bases, adjacent features are spaced apart laterally by a feature separation (FS') or separation span of the body (see FIG. 3A).

FIG. 3B shows that the geometric features may have rounded peaks and curved facets. FIG. 3C shows that the peaks of the geometric features may be flat.

FIG. 3D shows that both opposing surfaces of the film may have a structured surface.

FIGS. 5A-5W illustrate other cross-section shapes that may be used to provide the structured surface. These Figures further illustrate that the geometric feature may comprise a depression (See FIGS. 5A-5I and 5T) or a projection (see FIGS. 5J-5S and 5U-5W). In the case of features that comprise depressions, the elevated area between depressions may be considered to be a projection-type feature as shown in FIG. 3C.

Various feature embodiments may be combined in any manner so as to achieve a desired result. For example horizontal surfaces may separate features that have radiused or flat peaks. Moreover curved faces may be used on any of these features.

As can be seen from the Figures, the features may have any desired geometric shape, although in some embodiments, they are elongate. One or both surfaces may also include an element that is not elongate. They may be symmetric or asymmetric with respect to the z-axis of the film. Moreover, the structured surface may comprise a single feature, a plurality of the same feature in a desired pattern, or a combination of two or more features arranged in a desired pattern. Additionally, the dimensions, such as height and/or width, of the features may be the same across the structured surface. Alternatively, they may vary from feature to feature.

The microstructure geometric features illustrated in FIG. 2 either comprise or approximate a right angle prism. As used herein, a right angle prism has an apex angle of from about 70° to about 120', more likely from about 80° to 100°, most likely about 90°. While a right angle prism is illustrated, prisms of other angular configurations are also contemplated. Additionally the faces of the microstructure feature are flat or approximate a flat surface.

In another embodiment, the microstructure geometric features comprise a saw tooth-like prism. As used herein a saw tooth-like prism has a vertical, or nearly vertical side that forms an approximately 90' angle with the land or body. See FIG. 5J. In one useful embodiment, a saw-tooth-like prism may have has an angle of inclination from the land or body of from 2° to 15°.

It is also within the scope of the present invention that the features may be either continuous or discontinuous along the first in-plane axis.

Various embodiments of the film of the invention comprise the following dimensional relationships as set forth in FIGS. 2 and 3A:

A process of the invention generally comprises the steps of providing a structured surface polymeric film that is capable of being elongated by stretching and subsequently uniaxially stretching the film. The structured surface may either be provided concurrently with the formation of the film or it may be imparted to the first surface after the film has been formed. The process will be further explained with regard to FIGS. 6 and 7.

FIG. 6 is a schematic representation of a method according to the present invention. In the method, a tool 24 comprising a negative version of the desired structured surface of the film is provided and is advanced by means of drive rolls 26A and 26B past an orifice (not shown) of die 28. Die 28 comprises the discharge point of a melt train, here comprising an extruder 30 having a feed hopper 32 for receiving dry polymeric resin in the form of pellets, powder, etc. Molten resin exits die 28 onto tool 24. A gap 33 is provided between die 28 and tool 24. The molten resin contacts the tool 24 and hardens to form a polymeric film 34. The leading edge of the film 24 is then stripped from the tool 24 at stripper roll 36 and is directed to uniaxial stretching apparatus 38. The stretched film may then be wound into a continuous roll at station 40.

It should be noted that film 34 may be wound into a roll, or cut into sheets and stacked before being stretched in apparatus 38. It should also be noted that film 34 may be cut into sheets after being stretched rather than being wound into a continuous roll.

The film 34 may optionally be pre-conditioned (not shown) before the uniaxial stretching. Additionally, the film 34 may be post-conditioned (not shown) after stretching.

A variety of techniques may be used to impart a structured surface to the film. These include batch and continuous techniques. They may involve providing a tool having a surface that is a negative of the desired structured surface; contacting at least one surface of the polymeric film to the tool for a time and under conditions sufficient to create a positive version of the desired structured surface to the polymeric film; and removing the polymeric film with the structured surface from the tool. Typically the negative surface of the tool comprises a metallic surface.

Although the die 28 and tool 24 are depicted in a vertical arrangement with respect to one another, horizontal or other arrangements may also be employed. Regardless of the particular arrangement, the die 28 provides the molten resin to the tool 24 at the gap 33.

The die 28 is mounted in a manner that permits it to be moved toward the tool 24. This allows one to adjust the gap 33 to a desired spacing. The size of the gap 33 is a factor of the composition of the molten resin, the desired body thickness, its viscosity, its viscoelastic responses, and the pressure necessary to essentially completely fill the tool with the molten resin as will be understood by those in the art.

The molten resin is of a viscosity such that it substantially fills, optionally with applied vacuum, pressure, temperature, ultrasonic vibration or mechanical means, into the cavities of the tool 24. When the resin substantially fills the cavities of the tool 24, the resulting structured surface of the film is said to be replicated.

The negative surface of the tool can be positioned to create features across the width of the film (i.e., in the transverse (TD) direction) or along the length of the film (i.e., along the machine (MD) direction). Perfect alignment with the TD or MD direction is not required. Thus the tool may be slightly off angle from perfect alignment. Typically, this misalignment is no more than about 20°.

In the case that the resin is a thermoplastic resin, it is typically supplied as a solid to the feed hopper 32. Sufficient energy is provided to the extruder 30 to convert the solid resin to a molten mass. The tool is typically heated by passing it over a heated drive roll 26A. Drive roll 26A may be heated by, for example circulating hot oil through it or by inductively heating it. For some of the optical applications disclosed herein, the temperature of the tool 24 is typically from 20° C. below the softening point of the resin to the decomposition temperature of the resin. For other applications, the temperature of the tool is held below the softening point of the resin due to low viscosity and less stringent structure needs.

In the case of a polymerizable resin, including a partially polymerized resin, the resin may be poured or pumped directly into a dispenser that feeds the die 28. If the resin is a reactive resin, the method of the invention may include one or more additional steps of curing the resin. For example, the resin may be cured by exposure to a suitable radiant energy source such as actinic radiation such as ultraviolet light, infrared radiation, electron beam radiation, visible light, etc., for a time sufficient to harden the resin and remove it from the tool 24.

The molten film can be cooled by a variety of methods to harden the film for further processing. These methods include spraying water onto the extruded resin, contacting the unstructured surface of the tool with cooling rolls, or direct impingement of the film with air.

The previous discussion was focused on the simultaneous formation of the film and the structured surface. Another technique useful in the invention comprises contacting a tool to the first surface of a preformed film. Pressure, heat or pressure and heat are then applied to the film/tool combination until the surface of the film has softened sufficiently to create the desired structured surface in the film. Using this technique, the surface of the film is softened sufficiently to substantially completely fill the cavities in the tool. Subsequently, the film is cooled and removed from the tool.

In yet another technique, a preformed film may be machined, such as by diamond turning, to create a desired structured surface thereon.

As noted previously, the tool comprises a negative version (i.e., the negative surface) of the desired structured surface. Thus, it comprises projections and depressions (or cavities) in a predetermined pattern. The negative surface of the tool can be contacted with the resin so as to create the geometric features on the structured surface in any alignment with respect to the first or second in-plane axes. Thus, for example, the geometric features of FIG. 1 may be aligned with either the machine, or length, direction, or the transverse, or width, direction of the article.

It is typical that a release agent be applied to the tool to enhance removal of the resin from the tool. For example, organic materials such as oils and waxes and silicones have been used as release agents to provide release characteristics to surfaces. One of the disadvantages of these release agents is that they usually need to be frequently re-applied to the surface so as to provide adequate release properties. Polymeric release coatings such as those made from polytetrafluoroethylenes have addressed some of the shortcomings of oils, waxes, silicones and other temporary coatings and are often more durable. Typically however, polymeric release coatings require a thicker coating than the non-durable treatments, they can be subject to thickness variations, and can present application difficulties.

Additionally, it has been found that certain classes of polymers do not separate reliably and cleanly from the tool Consequently, it is difficult to replicate the negative surface of the tool with such polymers.

In one embodiment of the replication step, the cavities of the tool are at least 50% filled by the resin. In another embodiment, the cavities are at least 75% filled by the resin. In yet another embodiment, the cavities are at least 90 percent filled by the resin. In still another embodiment, the cavities are at least 95% filled by the resin. In event another embodiment, the cavities are at least 98% filled by the resin.

Adequate fidelity to the negative may be achieved for many applications when the cavities are filled to at least 50% by the resin. However, better fidelity to the negative is achieved when the cavities are filled to at least 90% by the resin. The best fidelity to the negative is achieved when the cavities are filled to at least 98% by the resin.

The tool used to create the desired structured surface has a coating comprising a fluorochemical benzotriazole on the negative surface. In one embodiment, the fluorochemical benzotriazoles forms a substantially continuous monolayer film on the tool. The molecules form "substantially continuous monolayer film" means that the individual molecules pack together as densely as their molecular structures allow. It is believed that the films self assemble in that the triazole groups of the molecules of the invention attach to available areas of the metal/metalloid surface of the tool and that the pendant fluorocarbon tails are aligned substantially towards the external interface.

The effectiveness of a monolayer film and the degree to which a monolayer film is formed on a surface is generally dependent upon the strength of the bond between the compound and the particular metal or metalloid surface of the tool and the conditions under which the film-coated surface is used. For example, some metal or metalloid surfaces may require a highly tenacious monolayer film while other such surfaces require monolayer films having much lower bond strength. Useful metal and metalloid surfaces include any surface that will form a bond with compounds of the invention and, in one embodiment, form a monolayer or a substantially continuous monolayer film. Examples of suitable surfaces for forming said monolayer films include those comprising copper, nickel, chromium, zinc, silver, germanium, and alloys thereof.

The monolayer or substantially continuous monolayer film may be formed by contacting a surface with an amount of the fluorochemical benzotriazole sufficient to coat the entire surface. The compound may be dissolved in an appropriate solvent, the composition applied to the surface, and allowed to dry. Suitable solvents include ethyl acetate, 2-propanol, acetate, 2 propanol, acetone, water and mixtures thereof. Alternatively, the fluorochemical benzotriazole may be deposited onto a surface from the vapor phase. Any excess compound may be removed by rinsing the substrate with solvent and/or through use of the treated substrate.

The fluorochemical benzotriazoles not only have been found to chemically bond to metal and metalloid surfaces, they also provide, for example, release and/or corrosion inhibiting characteristics to those surfaces. These compounds are characterized as having a head group that can bond to a metallic or metalloid surface (such as a master tool) and a tail portion that is suitably different in polarity and/or functionality from a material to be released. These compounds form durable, self-assembled films that are monolayers or substantially monolayers. The fluorochemical benzotriazoles include those having the formula:

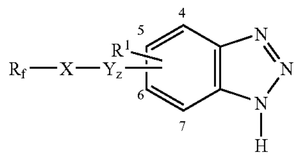

wherein $R_f$ is $C_nF_{2n+1}$—$(CH_2)_m$—, wherein n is an integer from 1 to 22 and m is 0, or an integer from 1 to 6; X is —$CO_2$—, —$SO_3$—, —CONH—, —O—, —S—, a covalent bond, —$SO_2NR$—, or —NR—, wherein R is H or $C_1$ to $C_5$ alkylene; Y is —$CH_2$— wherein z is 0 or 1; and R' is H, lower alkyl or $R_f$—X—$Y_z$— with the provisos that when X is —S—, or —O—, m is 0, and z is 0, n is ≥7 and when X is a covalent bond, m or z is at least 1. In one embodiment, n+m is equal to an integer from 8 to 20.

A particularly useful class of fluorochemical benzotriazole compositions for use as release agents comprising one or more compounds having the formula:

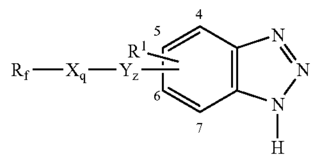

wherein $R_f$ is $C_nF_{2n+1}$—$(CH_2)_m$—, wherein n is 1 to 22, m is 0 or an integer from 1 to 6; X is —$CO_2$—, —$SO_3$—, —S—, —O—, —CONH—, a covalent bond, —$SO_2NR$—, or —NR—, wherein R is H or $C_1$ to $C_5$ alkylene, and q is 0 or 1; Y is $C_1$-$C_4$ alkylene, and z is 0 or 1; and R' is H, lower alkyl, or $R_f$—X—$Y_z$. Such materials are described, for example, in U.S. Pat. No. 6,376,065.

The process may optionally include a preconditioning step prior to stretching such as providing an oven or other apparatus. The preconditioning step may include a preheating zone and a heat soak zone. The stretch ratios may also be reduced from its maximum to control shrinkage. This is known in the art as "toe in".

The process may also include a post conditioning step. For example, the film may be first heat set and subsequently quenched.

Uniaxial stretching can occur in a conventional tenter or in a length orienter. A general discussion of film processing techniques can be found in "Film Processing", edited by Toshitaka Kanai and Gregory Campbell, 1999, Chapters 1, 2, 3, and 6. See also "The Science and Technology of Polymer Films," edited by Orville J. Sweeting, 1968, Vol. 1, pages 365-391 and 471-429. Uniaxial stretching can also be achieved in a variety of batch devices such as between the jaws of a tensile tester.

Uniaxial stretching processes include, but are not limited to, conventional "length orientation" between rollers rotating at different speeds, conventional cross-web stretching in a tenter, stretching in a parabolic-path tenter such as that disclosed in WO WO2002/096622 A1, and stretching between the jaws of a tensile tester.

For an ideal elastic material, uniaxial orientation will result if two of three mutually orthogonal stretch ratios are identical. For a material which undergoes no significant change in density upon stretching, each of the two substantially identical stretch ratios will be substantially equal to the square root of the reciprocal of the third orthogonal stretch ratio.

Films stretched in a conventional tenter, although uniaxially oriented, are not truly uniaxially oriented even though they have been uniaxially stretched, because the film is not free to contract along the axis of the direction of travel through the tenter, but is free to contract in the thickness direction. Films stretched in parabolic-path tenters, such as those disclosed in WO2002/096622 A1, are both uniaxially stretched and truly uniaxially oriented, because the parabolic path allows for an appropriate amount of contraction of the film along the axis of travel through the tenter. Processes other than parabolic-path tentering may also provide true uniaxial orientation, and the concept is not meant to be limited by the process employed.

True uniaxial orientation is also not limited to those processes that stretch film under uniaxial conditions throughout the entire history of the stretch. In one embodiment, deviation from a uniaxial stretch is maintained within certain tolerances throughout the various portions of the stretching step. However, processes in which deviations from uniaxiality early in a stretching process are compensated for later in the stretching process, and which yield true uniaxiality in the resulting film are also included in the scope of the invention.

Herein, the path traveled by the gripping means of the tenter stretching apparatus which grips a film edge, and hence, the path traced by an edge of the film as it travels through the tenter, is referred to as a boundary trajectory. It is within the present invention to provide a boundary trajectory that is three dimensional and substantially non-planar. The film may be stretched out-of-plane using out-of-plane boundary trajectories, that is, boundary trajectories that do not lie in a single Euclidean plane.

Though it is not required for true uniaxiality, using the parabolic-path tenter process, the film is stretched in-plane. In one embodiment, straight lines stretched along TD, the principal stretch direction, remain substantially straight after stretching. In conventional tenter processing of films, this is typically not the case, and lines so stretched acquire a substantial curvature or "bow".

The boundary trajectories may be, but do not need to be, symmetrical, forming mirror images through a central plane. This central plane is a plane passing through a vector in the initial direction of film travel and passing through the initial center point between the boundary trajectories, and a vector normal to the surface of the unstretched film being fed to the stretching apparatus.

Like other film stretching processes, parabolic-path tentering benefits from the selection of conditions such that a uniform spatial drawing of the film is maintained throughout the stretching process. Good spatial uniformity of the film may be achieved for many polymeric systems with careful control of the crossweb and downweb thickness distribution of the unstretched film or web and careful control of the temperature distribution across the web throughout the stretch. Many polymeric systems are particularly sensitive to non-uniformities and will stretch in a non-uniform fashion if caliper and temperature uniformity are inadequate. For example, polypropylenes tend to "line stretch" under uniaxial stretching. Certain polyesters, notably polyethylene naphthalate, are also very sensitive.

Whichever stretching technique is employed, stretching should be done substantially parallel to the first in-plane axis when shape retention of the geometric features is desired. It has been found that the more parallel the stretching is to the first in-plane axis, the better the shape retention that is achieved. Good shape retention can be achieved when the deviation from exactly parallel is no more than 20°. Better shape retention is achieved if the deviation is no more than 10° from exactly parallel. Even better shape retention is achieved if the deviation is no more than 5° from parallel.

The parabolic stretching step also can maintain the deviation from a uniaxial stretch within certain tolerances throughout the various portions of the stretching step. Additionally, these conditions can be maintained while deforming a portion of the film out-of-plane in an initial portion of the stretch, but return the film in-plane during a final portion of the stretch. In a truly uniaxial transverse stretch maintained throughout the entire history of the stretch, the instantaneous machine direction stretch ratio (MDDR) approximately equals the square root of the reciprocal of the transverse direction stretch ratio (TDDR) as corrected for density changes. As discussed above, the film may be stretched out-of-plane using out-of-plane boundary trajectories, i.e. boundary trajectories that do not lie in a single Euclidean plane. There are innumerable, but nevertheless particular, boundary trajectories meeting relational requirements of this embodiment of the present invention, so that a substantially uniaxial stretch history may be maintained using out-of-plane boundary trajectories.

Following stretching, the film may be heat set and quenched if desired.

Figure 7:
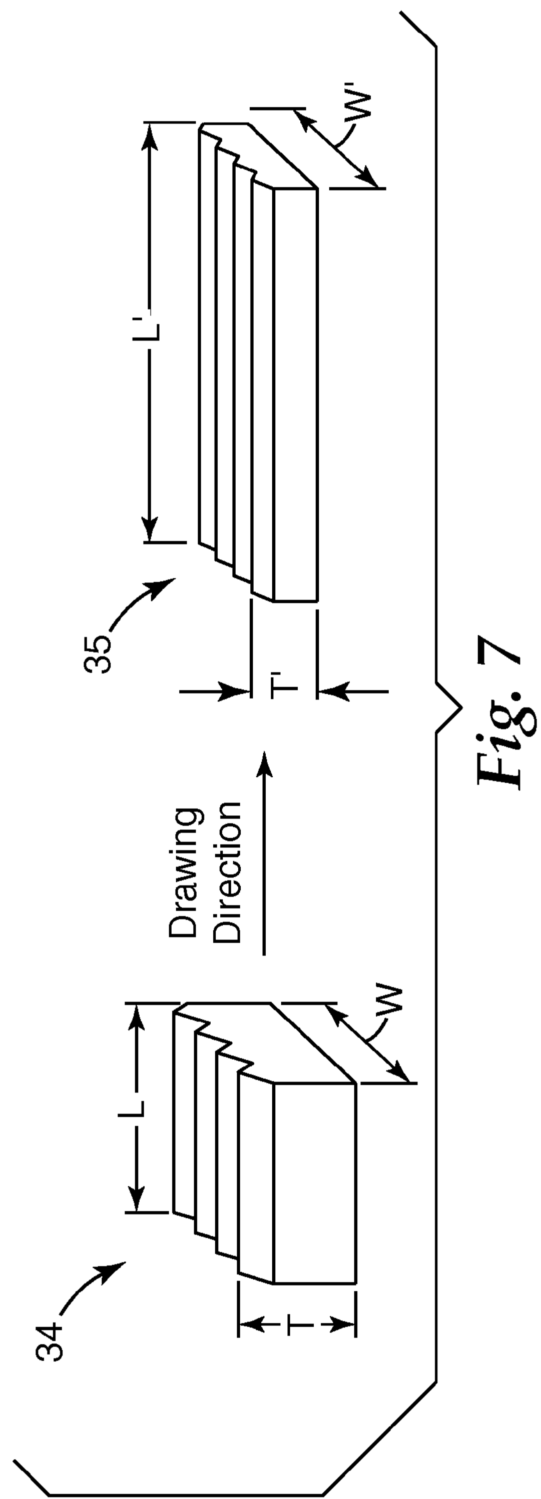
FIG. 7 is a perspective view of a structure surface film both before and after the stretching process, wherein the film after stretching is uniaxially oriented.

Referring now to FIG. 7, an unstretched structured surface film 34 has dimensions T, W and L, respectively representing the thickness, width, and length of the film. After the film 34 is stretched by a factor of lambda (λ), the stretched film 35 has the dimensions T', W', and L' respectively representing the stretched thickness, stretched width, and the stretched length of the film. This stretching imparts uniaxial character to the stretched film 35.

The relationship between the stretch ratios along the first in-plane axis, the second in-plane axis and the third axis is an indication of the fiber symmetry, and hence the uniaxial orientation of the stretched film. In the present invention, the film has a minimum stretch ratio along the first in-plane axis of at least 1.1. In one embodiment, the stretch ratio along the first in-plane axis is at least 1.5. In another embodiment of the invention, the stretch ratio is at least 1.7. In yet another embodiment, it is at least 3. Higher stretch ratios are also useful. For example, a stretch ratio of 3 to 10 or more is useful in the invention.

The stretch ratios along the second in-plane axis and the third axis are typically substantially the same in the present invention. This substantial sameness is most conveniently expressed as the relative ratio of these stretch ratios to one another. If the two stretch ratios are not equal, then the relative ratio is the ratio of the larger stretch ratio along one of these axes to the smaller stretch ratio along the other of the axes. In one embodiment, the relative ratio is less than 1.4. When the two ratios are equal the relative ratio is 1.

In the case of truly uniaxial stretching with a stretch ratio of λ along the first in-plane direction, when the process creates substantially the same proportional dimensional changes in the second in-plane axis and in the thickness direction of the film along the third axis, the thickness and the width will have been reduced by the same proportional dimensional changes. In the present case, this may be approximately represented by $KT/\lambda^{0.5}$ and $KW/\lambda^{0.5}$ where K represents a scale factor that accounts for density changes during stretch. In the ideal case, K is 1. When the density decreases during stretching, K is greater than 1. When density increases during stretching, K is less than 1.

Figure 8:
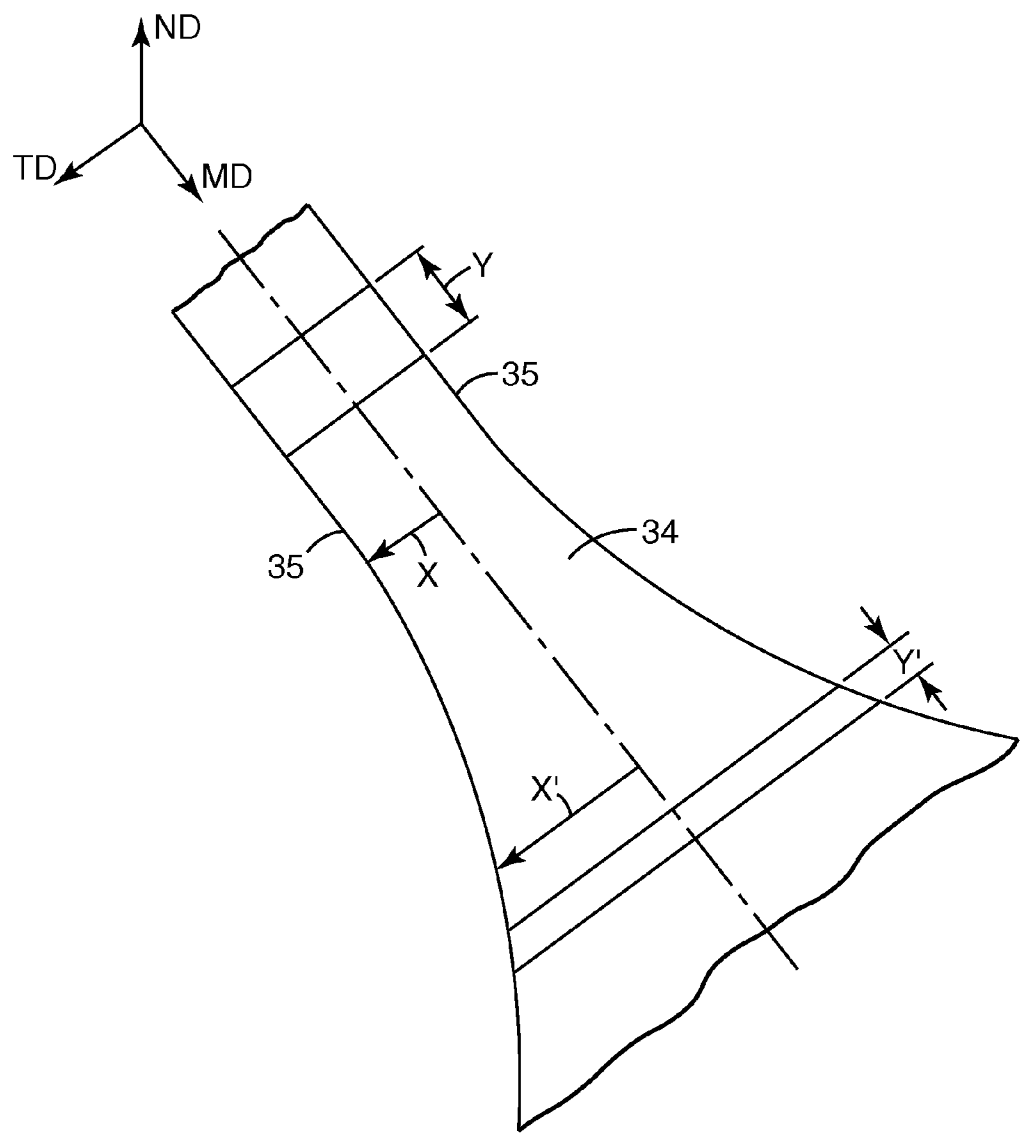
FIG. 8 is a schematic illustration of a method for uniaxially stretching a film according to the present invention also illustrating a coordinate axis showing a machine direction (MD), a normal, i.e., thickness, direction (ND), a transverse direction (TD).

In the invention, the ratio of the final thickness T' to initial thickness of the film T may be defined as the NDSR stretch ratio (NDSR). The MDSR may be defined as the length of a portion of the film after stretching divided by the initial length of that portion. For illustrative purposes only, see Y'/Y in FIG. 8. The TDSR may be defined as the width of a portion of the film after stretching divided by the initial width of that portion. For illustrative purposes only, see X'/X in FIG. 8.

The first in-plane direction may coincide with the MD, e.g., in the case of a length orientation, or TD, e.g., in the case of a parabolic tenter. In another example, sheets rather than a continuous web are fed into a tenter in the so-called batch tentering process. This process is described in U.S. Pat. No. 6,609,795. In this case the first in-plane direction or axis coincides with TD.

The present invention is applicable generally to a number of different structured surface films, materials and processes where a uniaxial characteristic is desired. The process of the present invention is believed to be particularly suited to fabrication of polymeric films having a microstructured surface where the visco-elastic characteristics of materials used in the film are exploited to control the amount, if any, of molecular orientation induced in the materials when the film is stretched during processing. The improvements include one or more of improved optical performance, enhanced dimensional stability, increased tensile properties, electete properties, better processability and the like.

In general, polymers used in the present invention may be crystalline, semi-crystalline, liquid crystalline or amorphous polymers or copolymers. It should be understood that in the polymer art it is generally recognized that polymers are typically not entirely crystalline, and therefore in the context of the present invention, crystalline or semi-crystalline polymers refer to those polymers that are not amorphous and includes any of those materials commonly referred to as crystalline, partially crystalline, semi-crystalline, etc. Liquid crystalline polymers, sometimes also referred to as rigid-rod polymers, are understood in the art to possess some form of long-range ordering which differs from three-dimensional crystalline order.

The present invention contemplates that any polymer either melt-processable or curable into film form may be used. These may include, but are not limited to, homopolymers, copolymers, and oligomers that can be further processed into polymers from the following families: polyesters (e.g., polyalkylene terephthalates (e.g., polyethylene terephthalate, polybutylene terephthalate, and poly-1,4-cyclohexanedimethylene terephthalate), polyethylene bibenzoate, polyalkylene naphthalates (e.g. polyethylene naphthalate (PEN) and isomers thereof (e.g., 2,6-, 1,4-, 1,5-, 2,7-, and 2,3-PEN)) and polybutylene naphthalate (PBN) and isomers thereof), and liquid crystalline polyesters); polyarylates; polycarbonates (e.g., the polycarbonate of bisphenol A); polyamides (e.g. polyamide 6, polyamide 11, polyamide 12, polyamide 46, polyamide 66, polyamide 69, polyamide 610, and polyamide 612, aromatic polyamides and polyphthalamides); polyether-amides; polyamide-imides; polyimides (e.g., thermoplastic polyimides and polyacrylic imides); polyetherimides; polyolefins or polyalkylene polymers (e.g., polyethylenes, polypropylenes, polybutylenes, polyisobutylene, and poly(4-methyl)pentene); ionomers such as Surlyn™ (available from E. I. du Pont de Nemours & Co., Wilmington, Del.); polyvinylacetate; polyvinyl alcohol and ethylene-vinyl alcohol copolymers, polymethacrylates (e.g., polyisobutyl methacrylate, polypropylmethaerylate, polyethylmethacrylate, and polymethylmethacrylate); polyacrylates (e.g., polymethyl acrylate, polyethyl acrylate, and polybutyl acrylate); polyacrylonitrile; fluoropolymers (e.g., perfluoroalkoxy resins, polytetrafluoroethylene, polytrifluoroethylene, fluorinated ethylene-propylene copolymers, polyvinylidene fluoride, polyvinyl fluoride, polychlorotrifluoroethylene, polyethylene-co-trifluoroethylene, poly(ethylene-alt-chlorotrifluoroethylene), and THV™ (3M Co.)); chlorinated polymers (e.g., polyvinylidene chloride and polyvinylchloride); polyarylether ketones (e.g., polyetheretherketone ("PEEK")); aliphatic polyketones (e.g., the copolymers and terpolymers of ethylene and/or propylene with carbon dioxide); polystyrenes of any tacticity (e.g., atactic polystyrene, isotactic polystyrene and syndiotactic polystyrene) and ring- or chain-substituted polystyrenes of any tacticity (e.g., syndiotactic poly-alpha-methyl styrene, and syndiotactic polydichlorostyrene); copolymers and blends of any of these styrenics (e.g., styrene-butadiene copolymers, styrene-acrylonitrile copolymers, and acrylonitrile-butadiene-styrene terpolymers); vinyl naphthalenes; polyethers (e.g., polyphenylene oxide, poly(dimethylphenylene oxide), polyethylene oxide and polyoxymethylene); cellulosics (e.g., ethyl cellulose, cellulose acetate, cellulose propionate, cellulose acetate butyrate, and cellulose nitrate); sulfur-containing polymers (e.g., polyphenylene sulfide, polysulfones, polyarylsulfones, and polyethersulfones); silicone resins; epoxy resins; elastomers (e.g., polybutadiene, polyisoprene, and neoprene), nylons and polyurethanes. Blends or alloys of two or more polymers or copolymers may also be used.

As noted above, it has been difficult to replicate surfaces using some polymers, especially polyesters. Generally they adhere tenaciously to the tool during the replication process. As a result, they are difficult to remove from the tool without causing damage to the replicated surface. Examples of semicrystalline thermoplastic polymers useful in the invention include semicrystalline polyesters. These materials include polyethylene terephthalate or polyethylene naphthalate. Polymers comprising polyethylene terephthalate or polyethylene naphthalate are found to have many desirable properties in the present invention.

Suitable monomers and comonomers for use in polyesters may be of the diol or dicarboxylic acid or ester type. Dicarboxylic acid comonomers include but are not limited to terephthalic acid, isophthalic acid, phthalic acid, all isomeric naphthalenedicarboxylic acids (2,6-, 1,2-, 1,3-, 1,4-, 1,5-, 1,6-, 1,7-, 1,8-, 2,3-, 2,4-, 2,5-, 2,8-), bibenzoic acids such as 4,4'-biphenyl dicarboxylic acid and its isomers, trans-4,4'-stilbene dicarboxylic acid and its isomers, 4,4'-diphenyl ether dicarboxylic acid and its isomers, 4,4'-diphenylsulfone dicarboxylic acid and its isomers, 4,4'-benzophenone dicarboxylic acid and its isomers, halogenated aromatic dicarboxylic acids such as 2-chloroterephthalic acid and 2,5-dichloroterephthalic acid, other substituted aromatic dicarboxylic acids such as tertiary butyl isophthalic acid and sodium sulfonated isophthalic acid, cycloalkane dicarboxylic acids such as 1,4-cyclohexanedicarboxylic acid and its isomers and 2,6-decahydronaphthalene dicarboxylic acid and its isomers, bi- or multi-cyclic dicarboxylic acids (such as the various isomeric norbornane and norbornene dicarboxylic acids, adamantane dicarboxylic acids, and bicyclo-octane dicarboxylic acids), alkane dicarboxylic acids (such as sebacic acid, adipic acid, oxalic acid, malonic acid, succinic acid, glutaric acid, azelaic acid, and dodecane dicarboxylic acid.), and any of the isomeric dicarboxylic acids of the fused-ring aromatic hydrocarbons (such as indene, anthracene, pheneanthrene, benzonaphthene, fluorene and the like). Other aliphatic, aromatic, cycloalkane or cycloalkene dicarboxylic acids may be used. Alternatively, esters of any of these dicarboxylic acid monomers, such as dimethyl terephthalate, may be used in place of or in combination with the dicarboxylic acids themselves.

Suitable diol comonomers include but are not limited to linear or branched alkane diols or glycols (such as ethylene glycol, propanediols such as trimethylene glycol, butanediols such as tetramethylene glycol, pentanediols such as neopentyl glycol, hexanediols, 2,2,4-trimethyl-1,3-pentanediol and higher diols), ether glycols (such as diethylene glycol, triethylene glycol, and polyethylene glycol), chain-ester diols such as 3-hydroxy-2,2-dimethylpropyl-3-hydroxy-2,2-dimethylpropyl-3-hydroxy-2,2-dimethyl propanoate, cycloalkane glycols such as 1,4-cyclohexanedimethanol and its isomers and 1,4-cyclohexanediol and its isomers, bi- or multicyclic diols (such as the various isomeric tricyclodecane dimethanols, norbornane dimethanols, norbornene dimethanols, and bicyclo-octane dimethanols), aromatic glycols (such as 1,4-benzenedimethanol and its isomers, 1,4-benzenediol and its isomers, bisphenols such as bisphenol A, 2,2'-dihydroxy biphenyl and its isomers, 4,4'-dihydroxymethyl biphenyl and its isomers, and 1,3-bis(2-hydroxyethoxy)benzene and its isomers), and lower alkyl ethers or diethers of these diols, such as dimethyl or diethyl diols. Other aliphatic, aromatic, cycloalkyl and cycloalkenyl diols may be used.

Tri- or polyfunctional comonomers, which can serve to impart a branched structure to the polyester molecules, can also be used. They may be of either the carboxylic acid, ester, hydroxy or ether types. Examples include, but are not limited to, trimellitic acid and its esters, trimethylol propane, and pentaerythritol.

Also suitable as comonomers are monomers of mixed functionality, including hydroxycarboxylic acids such as parahydroxybenzoic acid and 6-hydroxy-2-naphthalenecarboxylic acid, and their isomers, and tri- or polyfunctional comonomers of mixed functionality such as 5-hydroxyisophthalic acid and the like.

Suitable polyester copolymers include copolymers of PEN (e.g., copolymers of 2,6-, 1,4-, 1,5-, 2,7-, and/or 2,3-naphthalene dicarboxylic acid, or esters thereof, with (a) terephthalic acid, or esters thereof; (b) isophthalic acid, or esters thereof; (c) phthalic acid, or esters thereof; (d) alkane glycols; (e) cycloalkane glycols (e.g., cyclohexane dimethanol diol); (f) alkane dicarboxylic acids; and/or (g) cycloalkane dicarboxylic acids (e.g., cyclohexane dicarboxylic acid)), and copolymers of polyalkylene terephthalates (copolymers of terephthalic acid, or esters thereof; with (a) naphthalene dicarboxylic acid, or esters thereof; (b) isophthalic acid, or esters thereof; (c) phthalic acid, or esters thereof; (d) alkane glycols; (e) cycloalkane glycols (e.g., cyclohexane dimethane diol); (f) alkane dicarboxylic acids; and/or (g) cycloalkane dicarboxylic acids (e.g., cyclohexane dicarboxylic acid)). The copolyesters described may also be a blend of pellets where at least one component is a polymer based on one polyester and other component or components are other polyesters or polycarbonates, either homopolymers or copolymers.

The film of the invention may also contain a disperse phase comprising polymeric particles or oil or other incompatible phase separating material in a continuous polymeric matrix or a bi-continuous matrix of phases. In an alternative, embodiment of the invention, the disperse phase may be present in one or more of the layers of a multilayer film. The level of polymeric particles used is not critical to the present invention and is selected so as to achieve the purposes for which the final article is intended. Factors which may affect the level and type of the polymer particles include the aspect ratio of the particles, the dimensional alignment of the particles in the matrix, the volume fraction of the particles, the thickness of the structured surface film, etc. Typically, the polymer particles are chosen from the same polymers described above.

Films made in accordance with the present invention may be useful for a wide variety of products including tire cordage, reinforcement, filtration media, tape backings, wipes such as skin wipes, medical dressings, bandages, microfluidic films, membranes, blur filters, polarizers, reflective polarizers, dichroic polarizers, aligned reflective/dichroic polarizers, absorbing polarizers, retarders (including z-axis retarders), diffraction gratings, polarizing beam splitters, brightness enhancement films and polarizing diffraction gratings. The films may comprise the particular element itself or they can be used as a component in another element such as a tire, industrial belting, hoses, a dressing, a bandage, a face mask, a respirator, a filter, an adhesive tape, a wipe, a membrane, beamsplitters for front and rear projection systems, or as a brightness enhancement film used in a display or microdisplay.

The present inventive concept relates to attenuated polymeric structures (film, filament, single or multilayer) and to a method of obtaining such structures; and more particularly, to such a method wherein a polymeric structure comprising highly ordered replicated features is stretched to an extent that the features and underlying substrate are deformed in a controlled and cooperative manner, from the original cast or extruded form. Polymer (thermoplastic or extensible) structures (solid or microporous) of the concept are, in one embodiment, characterized by continuous (unbroken in at least one direction along the surface) replicated features (replicated to some geometric constraint between features) covering at least a portion of the surface. Structures of the concept are formed by attenuating a film (cast or profile extruded), with replicated features on at least a portion of the surface, along a major axis of the structure. Attenuation cooperatively elongates the features and base of the cast or extruded form to produce films or filaments with replicated surfaces. Attenuated structures of the concept can be produced with unique and useful combinations of geometric conformation and underlying structure. As an example, highly molecularly oriented (and crystallized) films can be produced with fine surface topographies that would be useful in applications like rubber reinforcement, filtration, or light management. These materials could be further processed through a fibrillation step to form microstructured-surface fiber structures for filtration. A further example of the unique combination of conformational and structural properties would be a microreplicated film made from phase-separable materials. An attenuated film of this structure would be microporous and carry a microreplicated surface topography. Materials such as this could find application in liquid filtration or water resistant wearing apparel. Attenuated filaments with replicated surface features would find applications in carpeting and personal care application where coverage (extended surface area) of the fiber is desirable.

Figure 10:
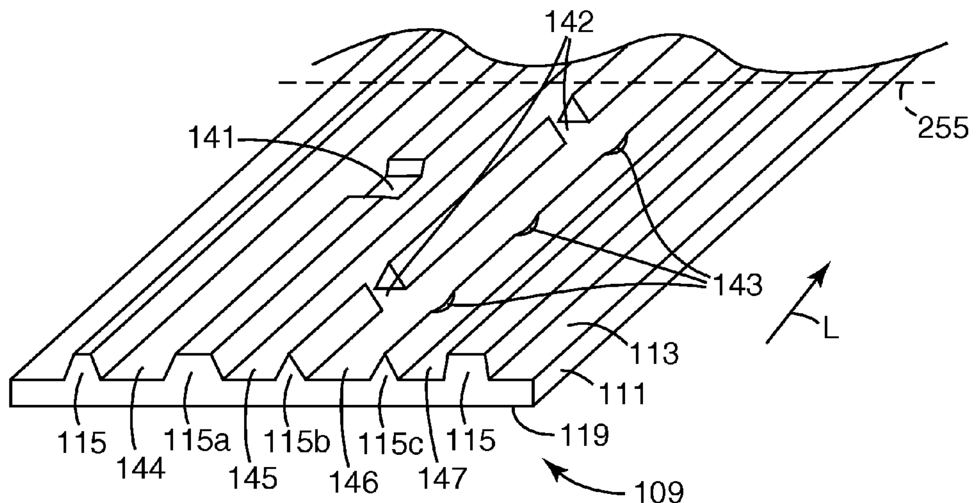
FIG. 10 is an isometric schematic illustration of a film article of the present invention, showing its elongate microstructure features.

In one embodiment, a polymeric film made according to the present invention, as formed prior to stretching, has a body having a first surface and a second surface and has one or more elongate microstructure features on at least one surface thereof. Such a film is illustrated, for example, in FIG. 10 as film 109, with a body or land portion 111, a first surface portion 113, a second surface portion 119, and elongate microstructure features 115 disposed on the first surface portion 113. The features are substantially parallel and extend substantially parallel to a longitudinal dimension L of the film body, and may be continuous along a length of the film (e.g., like features 115 in FIG. 10) or discontinuous along a length of the film (i.e., not extending along the entire length of the film; e.g., like feature 115*b* in FIG. 10). In lateral cross section, each feature has a pre-stretched shape (e.g., triangular, polygonal, etc.) and first thickness, and the body has a first thickness. Adjacent features may be contiguous when they join the body (see, e.g., FIG. 2), or at least some of the features may be spaced apart laterally by a separation span of the body (see, e.g., feature separation FS' in FIG. 3A). In one embodiment, at least one of the microstructure features has a discontinuity thereon, such as feature 115*a* (FIG. 10) bearing discontinuity 141 thereon, or may have a plurality of discontinuities thereon, such as features 115*b* and 115*c* bearing discontinuities 142 and 143, respectively, thereon. A discontinuity on a feature comprises any change in geometry on a surface of the feature, including for example, a shallow indentation such as discontinuities 141 and 143, or a discontinuity that extends through the entire thickness of a feature to the body, such as discontinuity 142. A discontinuity extends longitudinally along a feature, may extend laterally completely across a feature, or may extend only partially into a feature, such as a dimple or groove. In addition, a discontinuity may constitute a projection from a feature, such as a bump or ridge.

The film is stretched in a direction substantially parallel to the longitudinal dimension of the body, which elongates the body and microstructure features thereon. The body thus assumes a second thickness, similar or smaller than its first thickness (i.e., Z'<Z). The feature thickness may likewise by reduced upon stretching (i.e., P'<P). In one embodiment, the ratio after stretching of body thickness to feature thickness (i.e., body thickness divided by feature thickness) may range from 2 to 1, in another embodiment may be from 1 to 0.5, and in yet another embodiment the ratio of body thickness to feature thickness may as low as about 0.10. Accordingly, the body thickness may be relatively thin compared to the thickness of the features, as illustrated in exemplary stretched inventive film of FIG. 19. The body may provide just enough material to retain the features bonded together in a film structure for further processing or handling. In this way, the elongate microstructure features are joined together by a relatively thin, flexible body or land.

In this form, the stretched film has been oriented throughout its entirety, including both body and microstructure features. In other words, the morphology of each of the microstructure features is the same as the body—both have been oriented by stretching in the same manner to define a molecularly oriented polymeric film having a body with at least one surface thereof bearing elongate microstructure features. In one embodiment of the present invention, the film has a minimum stretch ratio in the longitudinal dimension of at least 1.1. In one embodiment, that stretch ratio is at least 1.5. In another embodiment of the invention, that stretch ratio is at least 1.7. In yet another embodiment, it is at least 3. Higher stretch ratios are also useful. For example, a stretch ratio of 3 to 20 or more is useful in the invention.

In one embodiment, the film is crystalline (not amorphous) and homogeneous. The stretched film exhibits anisotropic physical properties, relative to the longitudinal dimension of the body. For instance, Young's modulus of the oriented film in the longitudinal dimension is much different (i.e., higher) than Young's modulus in a lateral dimension or in a body thickness dimension. Similarly, the tensile strength of the film in the longitudinal dimension is much different (i.e., higher) than in a lateral dimension or in a body thickness dimension. Such unique anisotropic properties and morphology are believed to be achievable in the microstructured oriented film of the present invention, but are not achievable by machining microstructure features onto an already stretched film. This is because the machining process generates heat that alters the morphology of the film material. The oriented crystalline structure of the polymeric film is altered by the exposure to the thermal effects (i.e., heat) caused by the friction involved in the film material machining process. Thus, the present invention provides a process to create a molecularly oriented polymeric film having elongate microstructure features on at least one side thereof in a simple and efficient manner. The film may be cast and then stretched, rather than cast, stretched and then machined. Accordingly, the elimination of the machining step not only allows the formation of an oriented film having relatively uniform morphology throughout, it is more economical.

The stretched film has been elongated past its elongation point to orient the crystalline molecules therein, However, if the stretched film is later heated to a temperature above its glass transition state (but below its melting point), the longitudinally oriented crystalline alignment will break down and revert to a more random pattern. This will cause the film to shrink in the longitudinal dimension.

In one form, as mentioned above, the inventive film may be used as a reinforcing material for such applications as tire cordage. For vehicle tires, cordage material (e.g., like the reinforcing steel belts in "steel belted radials") is provided to reinforce the tire rubber and provide added strength and durability to the finished tire. The molecularly oriented polymeric film of the present invention can likewise serve this cordage purpose, since its microstructure features are oriented, and held in that orientation by the film's body, and thus provides an array of joined fibers or cords (i.e., the microstructured features) that are relatively strong in the longitudinal dimension of the film's body. The film may be oriented annularly about the axis of a tire being formed to provide hoop strength, in one or as many layers as desired. The layers may be aligned so that the longitudinal dimensions of the layered films are substantially parallel, or they are different. For instance, in another embodiment, one or more layers of such film may be aligned in alternative orientations (such as, for example, with the longitudinal dimension of the film's body parallel to the tire's axis, radiating from the tire's axis, or in an arc about the tire's axis). In addition, the film layers may be spaced apart, or they may be engaged, such that at least some of the features or structures on a first layer engage the second surface of the body of a second layer overlying the first layer. In addition, the relatively thin body provides a means for handling the elongate features for precise placement within the tire as it is being molded about the reinforcing cordage film, thus simplifying the production process of the reinforced tire. As opposed to a flat film that might be used for cordage purposes, the relatively high surface area of the inventive film's features and body also allow for enhanced bonding of the rubber to the film during tire assembly. This characteristic is even further enhanced by discontinuities in the microstructure features, since that creates additional feature surface area for bonding. Further, the polymeric material may be lighter in weight than prior cordage materials, while providing equivalent cord strength.

In another form, as mentioned above, the inventive film may be used as a reinforcing material for other applications, such as tape backings. When disposed with the longitudinal dimension of the film's body generally parallel to the length of a tape strip on a backing for the tape (or serving itself as the tape backing), the inventive film provides longitudinal reinforcement for the tape. In one embodiment, an adhesive is disposed on at least one surface of the body such as, for example, a pressure sensitive adhesive.

In another form, as mentioned above, the inventive film may be formed from a multi-phase film, where one component is in another in the film to create a porous structure. For example, the initial film that is cast or molded to have microstructure features on one side of its body may be a high density polyethylene (HDPE) with mineral oil therein. Upon stretching of this film, the spaces in the HDPE that were holding the mineral oil are elongated and become voids where the oil was. In addition, the stretched film may be further processed to remove much of the mineral oil therein (by known techniques). The stretching thus forms oriented microcavities in the longitudinal dimension, and the stretched film becomes a microporous membrane material that may be, for example, vapor permeable but not liquid permeable. The removal of mineral oil makes the film even more porous. If the film is further stretched in a lateral dimension (i.e., is thus biaxially oriented), the cavities or voids can be even further enlarged in volume and film porosity further increased. The microporous stretched film material (with microstructure features on at least one side thereof) can be used as a single microporous film material, or may be stacked upon similar film material layers to achieve a stacked array of microfluidic porous films. The elongate microstructure features thus serve to define fluidic flow channels between film layers, by spacing apart the bodies of layers of films. The stacked film layers may be aligned with the longitudinal dimensions of their bodies generally parallel, or they may be aligned in different directions (e.g., perpendicular). As noted above, separation spans may be provided between adjacent elongate microstructure features. Such separation spans may further enhance the fluidic flow capacity or diversion capabilities of the inventive film when used as a microporous membrane, by forming larger fluidic flow channels between adjacent features. Discontinuities on the microstructure features, such as discontinuities 141, 142 or 143, permit fluidic flow across a feature and thus between adjacent flow channels (such as between channels 144, 145, 146 and 147 shown on film 109 in FIG. 10. Providing discontinuities on the microstructure features may also increase the surface area of the features (and any microporous film or fibers they are disposed on).

Figure 11:
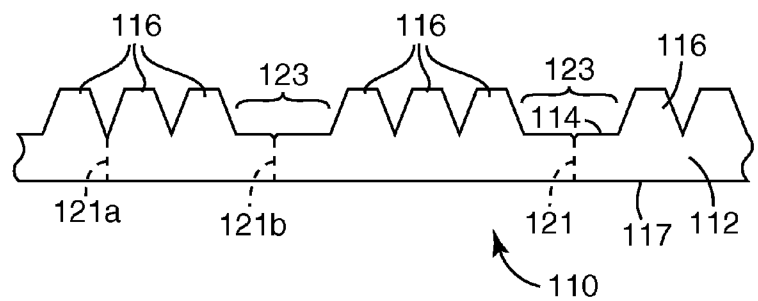
FIG. 11 is a sectional view of one embodiment film article of the present invention.
Figure 12:
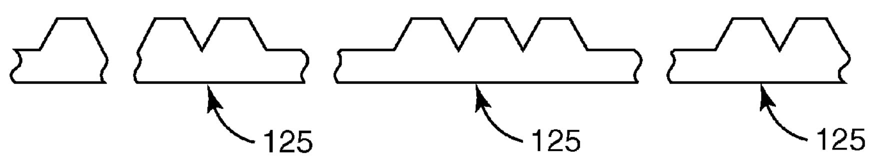
FIG. 12 is a sectional view of the film article of FIG. 11, after separation in to a plurality of fibers.

In another form, as mentioned above, the inventive film may be fibrillated after stretching to provide one or more longitudinally oriented fibers that may be useful for such applications as the formation of filtration media. To do so, the body connecting the elongate microstructure features is separated along generally longitudinally disposed separation lines, with each section of the separated body including one or more microstructure features thereon (although in one embodiment, there may be selected sections of the body which bear no features thereon). While the relatively thin body may separate under fibrillation on its own accord, the process of forming the film may also include the defining of longitudinal separation lines on the film. Those separation lines then define where the film separates to form fibers during fibrillation. As noted, a fiber may include only one microstructure feature, or may include several features (with connective portions of the body remaining between the several features to bind them together). For example, as seen in FIG. 11, a stretched film 110 having a body or land portion 112, a first surface portion 114, a second surface portion 117, and elongate microstructure features 116 disposed on the first surface portion 114, may have separation lines 121 formed on the body 112 of the film 110. In some cases, adjacent features 116 may have a separation span 123 therebetween. The separation lines may be between adjacent features (such as separation line 121*a*) or may be disposed in a separation span, such as separation line 121*b*, and thus spaced laterally from the microstructure features on each side of that separation span 121*b*. A separation line 121 may be defined in the body 112 (such as, for example, a score line or weakened segment of the body) for use in separating the stretched film 110 into fibers or fiber elements 125 (see FIG. 12) during fibrillation. In this case, fibrillation is the process of splitting a longitudinally oriented film into a network of interconnected fibers, and may be achieved by fibrillation processes known in the art.

Fibrillation of the inventive film results in a plurality of oriented, crystalline and homogenous polymeric fibers having generally uniform morphology. The features on the fibers may have the same characteristics as the features on the stretched film from which the fibers are formed. For instance, the features on the fibers have a high feature thickness to body thickness relationship, which is not possible to attain by machining of an oriented film to create the features.

Figure 13:
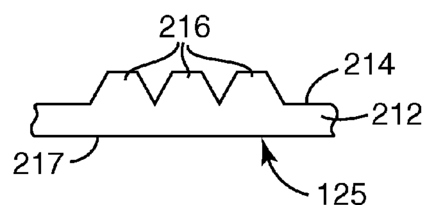
FIG. 13 is a sectional view of one embodiment of a fiber article of the present invention.
Figure 14:
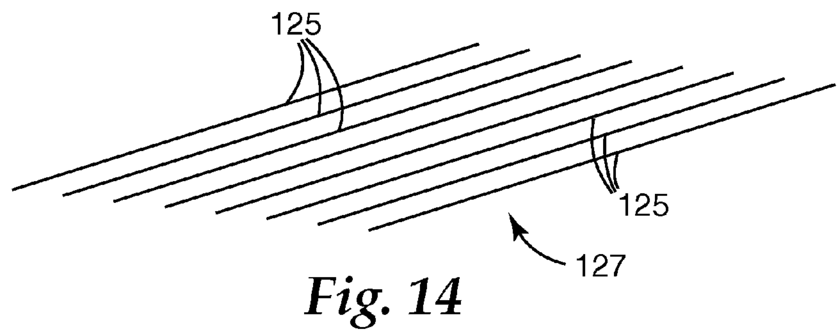
FIG. 14 is an isometric schematic illustration of an array of fiber articles of the present invention.
Figure 15:
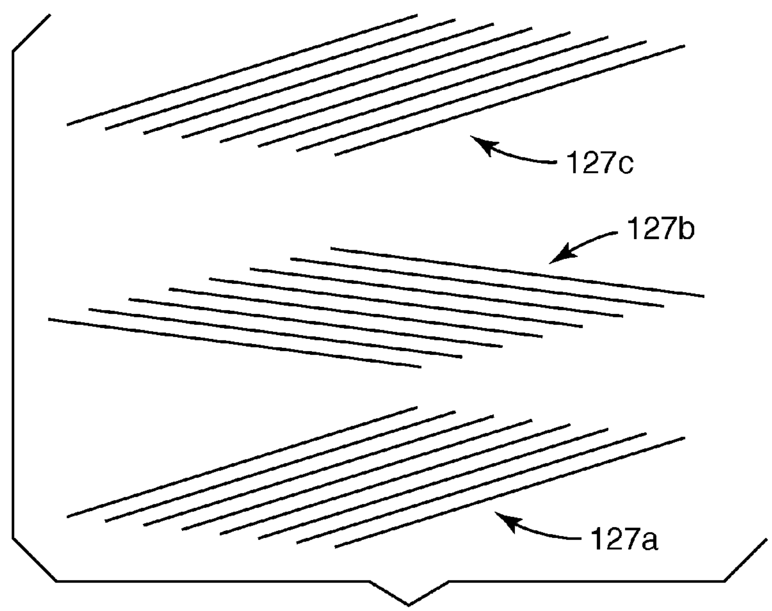
FIG. 15 is an isometric exploded schematic illustration of a plurality of overlying arrays of fiber articles of the present invention.

As seen, for example, in FIG. 13, each fiber 125 thus formed may have a fiber body or land portion 212, a first surface portion 214, a second surface portion 217, and one or more elongate microstructure features 216 disposed on the first surface portion 214 of the fiber body 212. Each fiber body 212 has a longitudinal dimension (like the film 110 that formed it), and the features 216 likewise are disposed in a direction substantially parallel to the longitudinal dimension of the fiber body 212, and are substantially parallel. The fibers can be cut laterally and then mixed together to form a filtration layer of mixed fibers in any desired shape (e.g., a filter pad, a filter cylinder, a filter cone, etc.) and density. Alternatively, the fibers may be maintained in an array where the fiber bodies of the fibers in the array are substantially parallel, such as illustrated schematically by array 127 of fibers 125 in FIG. 14. In this configuration, the array 127 of fibers 125 may also be used for filtration, or in a reinforcement capacity such as tire cordage or tape backing, as referenced above. Like the film as also discussed above, an array of fibers may serve as a layer and layers may over lie each other, such as illustrated schematically in FIG. 15 by overlaying arrays 127*a*, 127*b* and 127*c* of fibers. Overlaying layers or arrays may be engaged, or may be spaced apart, and the longitudinal dimensions of the fibers in such arrays may be aligned substantially parallel or may be disposed in different directions.

Figure 16:
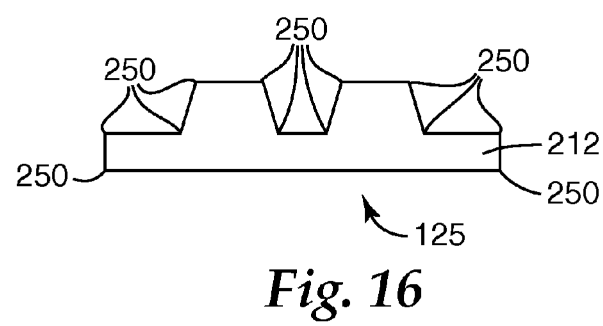
FIG. 16 is a sectional view of one embodiment of a fiber article of the present invention.

Additionally, the fibers may be charged with an electric potential to further aid in their filtration capacities. To do so, the polymeric film is exposed to an electrical field (e.g., by passing the film by a corona wire) to define the film as an electret. The exposing step may precede the stretching step for the film, or may be done after the film is stretched. On the film, at least one of the microstructure features is shaped to enhance electrical field effects. Thus, when the film is separated into fibers, each fiber is an electret, and in one embodiment, at least one of the microstructure features on a fiber is shaped to enhance electrical field effects. As illustrated, for example, in FIG. 16, a fiber 125 has a fiber body 212 that has a number of edges or points 250 (in lateral view) that create electrical potential discontinuities around the fiber body 212. These focused charge areas (i.e., edges 250) on the fiber 125 can further aid the fiber in a filtration context by electrically attracting particulate materials to the fiber. Hence, the more such edges on a fiber, the better, for filtration purposes. The inventive film, when segmented into fibers, allows the creation of fibers having microstructure features thereon with any desired number of edges. In addition, the formation of surface discontinuities on a microstructure feature can define additional edges along the elongate length of the feature and, in turn, create additional electrical potential discontinuities along the fiber body. This not only creates more electrical potential field effect attraction for the fiber, but also increases its surface area for filtration purposes. The result of a filtration layer of such fibers is a highly effective filtration medium. As noted above, the stretched film itself may be defined as an electret by charge application. Thus, when the film is used for fluidic flow purposes or in a filtration context, it also can attract particles to it to collect those particles.

In one embodiment, when forming a polymeric film of the present invention (for use either as a film or to form fibers from a film), at least one generally laterally disposed separation line may be defined across the longitudinal dimension of the body of the film. For example, such a lateral separation line is illustrated by line 255 across the film 109 of FIG. 10. Such a separation line 255 may be defined as, for example, a score line or weakened segment of the body and/or microstructure features along the line 255 for use in separating the film or fiber (after stretching) into fibers element segments. For fibers, such segment separation may constitute a separate processing step or may occur at the same time as fibrillation. Alternatively, a film (e.g., tape) may be formed with a plurality of lateral separation lines along its longitudinal dimension but is not separated into tape segments until such time as the use defines a desired length of tape. The lateral separation line then facilitates the tearing off of a selected tape segment.

In addition to the other characteristics noted herein, the inventive film (and the fibers formed therefrom) may be formed as a microporous film (or fiber) that contains microparticlate material. The microparticulate material (which can be one material or a combination of materials) useful in the present invention is non-swellable in aqueous and organic media and is substantially insoluble in water or the elution solvent. Not more than 1.0 gram of particulate will dissolve in 100 g. of aqueous media or elution solvent into which particulate is mixed at 20.degree C. The particulate material can be an organic compound, a polymer, or an inorganic oxide such as silica, alumina, titania, zirconia, and other ceramics, or it can be ion exchange or chelating particles. Suitable particles for the purposes of this invention include any particle which can be coated with insoluble, non-swellable sorbent material or the surface (external and/or internal) of which can be derivatized to provide a coating of insoluble, non-swellable sorbent material thereon. Such particles in film are disclosed in U.S. Pat. No. 4,810,381.

In addition, other additives (e.g., a catalyst (e.g., CO oxidative catalytically active nano-gold particles), carbon fibers or particles, or pigment materials) may be added to the film to provide it or the fibers created thereby with desired properties. In addition, the film and fibers formed therefrom may be adsorbent or absorbent.

In the above description, the position of elements has sometimes been described in terms of "first", "second", "third", "top" and "bottom". These terms have been used merely to simplify the description of the various elements of the invention, such as those illustrated in the drawings. They should not be understood to place any limitations on the useful orientation of the elements of the present invention.

Accordingly, the present invention should not be considered limited to the particular examples described above, but rather should be understood to cover all aspects of the invention as fairly set out in the claims. Various modifications, equivalents, as well as numerous structures to which the present invention may be applicable will be readily apparent to those of skill in the art to which the present invention is directed upon review of the present specification. The claims are intended to cover such modifications and devices.

EXAMPLES

Example 1

A polyethylene terephthalate (PET) with an inherent viscosity (I.V.) of 0.74 available from Eastman Chemical Company, Kingsport, Tenn. was used in this example.

The PET pellets were dried to remove residual water and loaded into the extrusion of an extruder hopper under a nitrogen purge. The PET was extruded with a increasing temperature profile of 232° C. to 282° C. within the extruder and the continuing melt train through to the die set at 282° C. Melt train pressures were continuously monitored and an average taken at the final monitored position along the melt train prior to bringing the die into close proximity to the tool onto which the polymer film is formed simultaneously with the structuring of a first surface of that film against the tool.

The tool was a structured belt having a negative version of the structured surface formed on the cast film. The structured surface comprised a repeating and continuous series of triangular prisms. The triangles formed a sawtooth-like pattern. The basal vertices of the individual prisms were shared by their adjoining, neighboring structures. The prisms were aligned along the casting or machine direction (MD) direction. The structured surface of the tool was coated with a fluorochemical benotriazole having the formula

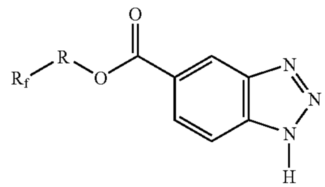

where $R_f$ is $C_8F_{17}$ and R is —$(CH_2)_2$—, as disclosed in U.S. Pat. No. 6,376,065. The tool was mounted on a temperature-controlled rotating can which provides a continuous motion of the tool surface along the casting (MD) direction. The measured surface temperature of the tool averaged 92° C.

The die orifice through which the molten polymer exits the melt train was brought into close proximity with the rotating belt tool forming a final slot between the tool and die. The pressure at the final monitored position along the melt train increased as the die and tool became closer. The difference between this final pressure and the previously recorded pressure is referred to as the slot pressure drop. The slot pressure drop in this example was $7.37\times10^6$ Pa (1070 psi) providing sufficient pressure to drive the molten polymer into the structured cavities formed by the tool negative. The film thereby formed and structured, was conveyed by the tool rotation from the slot, quenched with additional air cooling, stripped from the tool and wound into a roll. Including the height of the structures, the total thickness of the cast film (T) was about 510 microns.

The cast and wound polymer film closely replicated the tool structure. Using a microscope to view the cross-section a prismatic structure was identified on the surface of the film with an approximately 85° apex angle, 20° inclination from the horizontal of the film land for one leg of the triangle and a 15° tilt from the perpendicular for the opposite leg. The measured profile exhibited the expected, nearly right triangular form with straight edges and a slightly rounded apex. The replicated prisms on the polymeric film surface were measured to have a basal width (BW) of 44 microns and a height (P) of 19 microns. The peak-to-peak spacing (PS) was approximately the same as the basal width (BW). The tool is also imperfect and small deviations from nominal sizing can exist.

The structured cast film was cut into sheets with an aspect ratio of 10:7 (along the grooves:perpendicular to grooves), preheated to about 100° C. as measured in the plenums and stretched to a nominal stretch ratio of 6.4 and immediately relaxed to a stretch ratio of 6.3 in a nearly truly uniaxial manner along the continuous length direction of the prisms using a batch tenter process. That is individual sheets were fed to a conventional continuous operation film tenter. The relaxation from 6.4 to 6.3 is accomplished at the stretch temperature to control shrinkage in the final film. The structured surfaces maintained a prismatic shape with reasonably straight cross-sectional edges (reasonably flat facets) and approximately similar shape. The basal width after stretch (BW') was measured by microscopy cross-sectioning to be 16.5 microns and the peak height after stretch (P') was measured to be 5.0 microns. The final thickness of the film (T'), including the structured height, was measured to be 180 microns. The indices of refraction were measured on the backside of the stretched film using a Metricon Prism Coupler as available from Metricon, Piscataway, N.J., at a wavelength of 632.8 nm. The indices along the first in-plane (along the prisms), second in-plane (across the prisms) and in the thickness direction were measured to be 1.672, 1.549 and 1.547 respectively. The relative birefringence in the cross-sectional plane of this stretched material was thus 0.016.

Example 2

A polyethylene terephthalate (PET) with an inherent viscosity (I.V.) of 0.74 available from Eastman Chemical Company, Kingsport, Tenn. was used in this example.

The PET pellets were dried to remove residual water and loaded into the extrusion hopper under a nitrogen purge. The PET was extruded with a flat temperature profile about 282° C. within the extruder and the continuing melt train through to the die set at 282° C. Melt train pressures were continuously monitored and an average taken at the final monitored position along the melt train prior to bringing the die into close proximity to the tool onto which the polymer film is formed simultaneously with the structuring of a first surface of that film against the tool.

The tool was a structured belt having the desired negative version of the structured surface formed on the cast film. The structured surface comprised a repeating and continuous series of isosceles right triangular prisms, with basal widths (BW) of 50 microns and height (P) of nearly 25 microns. The basal vertices of the individual prisms were shared by their adjoining, neighboring structures. The prisms were aligned along the casting (MD) direction. The structured surface of the tool was coated with a fluorochemical benezotriazole having the formula

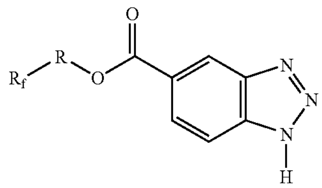

where $R_f$ is $C_4F_9$ and R is —$(CH_2)_6$—. The tool was mounted on a temperature-controlled rotating can which provides a continuous motion of the tool surface along the casting (MD) direction. The measured surface temperature of the tool averaged 98° C.

The die orifice through which the molten polymer exits the melt train was brought into close proximity with the rotating belt tool forming a final slot between the tool and die. The pressure at the final monitored position along the melt train increased as the die and tool became closer. The difference between this final pressure and the previously recorded pressure is referred to as the slot pressure drop. The slot pressure drop in this example was $7.92\times10^6$ Pa (1150 psi) providing sufficient pressure to drive the molten polymer into the structured cavities formed by the tool negative. The film thereby formed and structured, was conveyed by the tool rotation from the slot, quenched with additional air cooling, stripped from the tool and wound into a roll. Including the height of the structures, the total thickness of the cast film (T) was about 600 microns.

The cast and wound polymer film closely replicated the tool structure. Using contact profilometry, (e.g. a KLA-Tencor P-10 with a 60° 2 micron radius stylus). a clear, reasonably sharp prismatic structure was identified on the surface of the film. The measured profile exhibited the expected, nearly right triangular form with straight edges and a slightly rounded apex. The replicated prisms on the polymeric film surface were measured to have a basal width (BW) of 50 microns and a height (P) of 23.4 microns. The peak-to-peak spacing (PS) was approximately the same as the basal width (BW). The profilometry is limited to about a micron in resolution due to the shape and size of the stylus probe and the actual apex may be considerably higher. The tool is also imperfect and small deviations from nominal sizing can exist. A ratio of the profile-measured cross-sectional area to the ideal calculated cross-sectional area provided a calculated fill of 99%.

The structured film can be stretched in a manner similar to that in Example 1.

Example 3

A polyethylene naphthalate (PEN) with an inherent viscosity (I.V.) of 0.56 was made in a reactor vessel.

The PEN pellets were dried to remove residual water and loaded into the extrusion hopper under a nitrogen purge. The PEN was extruded with a flat temperature profile of 288° C. within the extruder and the continuing melt train through to the die set at 288° C. Melt train pressures were continuously monitored and an average taken at the final monitored position along the melt train prior to bringing the die into close proximity to the tool onto which the polymer film is formed simultaneously with the structuring of a first surface of that film against the tool.

The tool was a structured belt having the desired negative version of the structured surface formed on the cast film. The structured surface comprised a repeating and continuous series of isosceles right triangular prisms, with basal widths (BW) of 50 microns and height (P) of nearly 25 microns. The basal vertices of the individual prisms were shared by their adjoining, neighboring structures. The prisms were aligned along the casting (MD) direction. The structured surface of the tool was coated with a fluorochemical benzotriazole having the formula

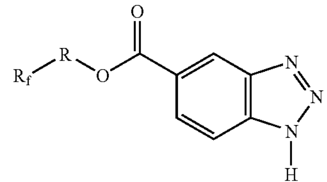

where $R_f$ is $C_8F_{17}$ and R is —$(CH_2)_2$—. The tool was mounted on a temperature-controlled rotating can which provides a continuous motion of the tool surface along the casting (MD) direction. The measured surface temperature of the tool averaged 144° C.

The die orifice through which the molten polymer exits the melt train was brought into close proximity with the rotating belt tool forming a final slot between the tool and die. The pressure at the final monitored position along the melt train increased as the die and tool became closer. The difference between this final pressure and the previously recorded pressure is referred to as the slot pressure drop. The slot pressure drop in this example was $5.51\times10^6$ Pa (800 psi) providing sufficient pressure to drive the molten polymer into the structured cavities formed by the tool negative. The film thereby formed and structured, was conveyed by the tool rotation from the slot, quenched with additional air cooling, stripped from the tool and wound into a roll. Including the height of the structures, the total thickness of the cast film (T) was about 600 microns.

The cast and wound polymer film closely replicated the tool structure. Using contact profilometry, (e.g. a KLA-Tencor P-10 with a 60° 2 micron radius stylus). A clear, reasonably sharp prismatic structure was identified on the surface of the film. The measured profile exhibited the expected, nearly right triangular form with straight edges and a slightly rounded apex. The replicated prisms on the polymeric film surface were measured to have a basal width (BW) of 50 microns and a height (P) of 23.3 microns. The peak-to-peak spacing (PS) was approximately the same as the basal width (BW). The profilometry is limited to about a micron in resolution due to the shape and size of the stylus probe and the actual apex may be considerably higher. The tool is also imperfect and small deviations from nominal sizing can exist. To better characterize the actual extent of fill, e.g. characterize the precision of replication with the tool, the profilometry cross-section was fit to a triangle. Using data from the measured profile, the edges were fit as straight lines along the legs of the cross-section between 5 and 15 micron height as measured from the base. An ideal apex height of 24.6 microns was calculated. A ratio of the profile-measured cross-sectional area to the ideal calculated cross-sectional area provided a calculated fill of 98.0%.

The structured cast film was stretched in a nearly truly uniaxial manner along the continuous length direction of the prisms, using a batch tenter process. The film was preheated to nominally 165° C. as measured in the plenums and stretched at this temperature over 25 seconds at a uniform speed (edge separation) to a final stretch ratio of about 6. The structured surfaces maintained a prismatic shape with reasonably straight cross-sectional edges (reasonably flat facets) and approximately similar shape.

Example 4

A polyethylene naphthalate (PEN) with an inherent viscosity (I.V.) of 0.56 was made in a reactor vessel.

The PEN pellets were dried to remove residual water and loaded into the extrusion hopper under a nitrogen purge. The PEN was extruded with a flat temperature profile of 288° C. within the extruder and the continuing melt train through to the die set at 288° C. Melt train pressures were continuously monitored and an average taken at the final monitored position along the melt train prior to bringing the die into close proximity to the tool onto which the polymer film is formed simultaneously with the structuring of a first surface of that film against the tool.

The tool was a structured belt having the desired negative version of the structured surface formed on the cast film. The structured surface comprised a repeating and continuous series of isosceles right triangular prisms, with basal widths (BW) of 50 microns and height (P) of nearly 25 microns. The basal vertices of the individual prisms were shared by their adjoining, neighboring structures. The prisms were aligned along the casting (MD) direction. The structured surface of the tool was coated with a fluorochemical benzotriazole having the formula

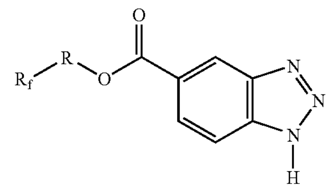

where $R_f$ is $C_8F_{17}$ and R is $-(CH_2)_2-$, as disclosed in U.S. Pat. No. 6,376,065. The tool was mounted on a temperature-

TABLE 1 shows the effect of stretching at various distances from the center of the cast film.

| Relative Distance from Center | Nominal Length Stretch Ratio | Thick. Stretch Ratio | Ratio of higher to lower cross sectional stretch ratios | Thickness (T') microns | Peak Height (P') Microns | Peak width (BW') Microns | In-plane refractive index along stretch | In-plane refractive index perp. to stretch | Refractive index through thickness | Relative Birefringence |
|---|---|---|---|---|---|---|---|---|---|---|
| 0.000 | 0.427 | 0.381 | 1.12 | 230 | 8.4127 | 22.025 | 1.8095 | 1.5869 | 1.5785 | 0.0370 |
| 0.044 | 0.427 | 0.385 | 1.11 | 230 | 8.4494 | 21.95385 | 1.81 | 1.5873 | 1.5781 | 0.0405 |
| 0.089 | 0.427 | 0.377 | 1.13 | 230 | 8.4226 | 22.08462 | 1.8101 | 1.5869 | 1.5779 | 0.0395 |
| 0.133 | 0.427 | 0.414 | 1.03 | 250 | 8.3739 | 22.16154 | 1.8101 | 1.5871 | 1.5778 | 0.0409 |
| 0.178 | 0.427 | 0.385 | 1.11 | 230 | 8.3923 | 22.05 | 1.8104 | 1.5866 | 1.5781 | 0.0373 |
| 0.222 | 0.422 | 0.377 | 1.12 | 230 | 8.3194 | 21.9286 | 1.8132 | 1.5859 | 1.5799 | 0.0261 |
| 0.267 | 0.417 | 0.368 | 1.13 | 220 | 8.1205 | 21.85 | 1.8153 | 1.5859 | 1.5778 | 0.0347 |
| 0.311 | 0.417 | 0.352 | 1.18 | 210 | 7.8141 | 21.9143 | 1.8166 | 1.5859 | 1.5752 | 0.0453 |
| 0.356 | 0.411 | 0.335 | 1.23 | 200 | 7.4737 | 21.9615 | 1.818 | 1.5875 | 1.5744 | 0.0553 |
| 0.400 | 0.406 | 0.322 | 1.26 | 190 | 7.1668 | 22.1071 | 1.8173 | 1.5887 | 1.572 | 0.0705 |
| 0.444 | 0.406 | 0.31 | 1.31 | 190 | 6.8934 | 22.5143 | 1.8166 | 1.5908 | 1.5727 | 0.0771 |
| 0.489 | 0.411 | 0.301 | 1.37 | 180 | 6.6182 | 22.85 | 1.8161 | 1.5917 | 1.5718 | 0.0849 |
| 0.533 | 0.417 | 0.289 | 1.44 | 170 | 6.3933 | 23.4154 | 1.8146 | 1.5924 | 1.5714 | 0.0902 |
| 0.578 | 0.422 | 0.272 | 1.55 | 160 | 5.8504 | 24.2167 | 1.8163 | 1.5979 | 1.5686 | 0.1257 |
| 0.622 | 0.438 | 0.264 | 1.66 | 160 | 5.6835 | 25.3154 | 1.8131 | 1.5988 | 1.5662 | 0.1414 |
| 0.667 | 0.458 | 0.264 | 1.73 | 160 | 5.6538 | 26.8769 | 1.8112 | 1.6014 | 1.5643 | 0.1625 |
| 0.711 | 0.484 | 0.26 | 1.86 | 160 | 5.6149 | 28.725 | 1.8111 | 1.6112 | 1.5615 | 0.2211 |
| 0.756 | 0.51 | 0.251 | 2.03 | 150 | 5.5633 | 30.8818 | 1.811 | 1.6089 | 1.5579 | 0.2241 |
| 0.800 | 0.552 | 0.247 | 2.23 | 150 | 5.4791 | 33.77 | 1.8117 | 1.6128 | 1.552 | 0.2652 |
| 0.844 | 0.594 | 0.243 | 2.44 | 150 | 5.6443 | 36.075 | 1.8143 | 1.6164 | 1.5454 | 0.3042 |

Relative distance from center = distance from center/one half of the width of the film controlled rotating can which provides a continuous motion of the tool surface along the casting (MD) direction. The measured surface temperature of the tool averaged 153° C.

The die orifice through which the molten polymer exits the melt train was brought into close proximity with the rotating belt tool forming a final slot between the tool and die. The pressure at the final monitored position along the melt train increased as the die and tool became closer. The difference between this final pressure and the previously recorded pressure is referred to as the slot pressure drop. The slot pressure drop in this example was $4.13\times10^6$ Pa (600 psi) providing sufficient pressure to drive the molten polymer into the structured cavities formed by the tool negative. The film thereby formed and structured, was conveyed by the tool rotation from the slot, quenched with additional air cooling, stripped from the tool and wound into a roll. Including the height of the structures, the total thickness of the cast film (T) was about 600 microns.

The cast and wound polymer film closely replicated the tool structure. Using contact profilometry, (e.g. a KLA-Tencor P-10 with a 60° 2 micron radius stylus). A clear, reasonably sharp prismatic structure was identified on the surface of the film. The measured profile exhibited the expected, nearly right triangular form with straight edges and a slightly rounded apex. The replicated prisms on the polymeric film surface were measured to have a basal width (BW) of microns and a height (P) of 23.5 microns. The peak-to-peak spacing (PS) was approximately the same as the basal width (BW). The profilometry is limited to about a micron in resolution due to the shape and size of the stylus probe and the actual apex may be considerably higher. The tool is also imperfect and small deviations from nominal sizing can exist. To better characterize the actual extent of fill, e.g. characterize the precision of replication with the tool, the profilometry cross-section was fit to a triangle. Using data from the measured profile, the edges were fit as straight lines along the legs of the cross-section between 5 and 15 micron height as measured from the base. An ideal apex height of 24.6 microns with an included apex angle of 91.1° was calculated. A ratio of the profile-measured cross-sectional area to the ideal calculated cross-sectional area provided a calculated fill of 98.0%.

The structured cast film was stretched in a nearly truly uniaxial manner along the continuous length direction of the prisms using the batch tenter process. The film was preheated to nominally 158° C. for stretched at this temperature over 90 seconds at a uniform speed (edge separation) to a final stretch ratio of about 6. The structured surfaces maintained a prismatic shape with reasonably straight cross-sectional edges (reasonably flat facets) and approximately similar shape.

The same contact profilometry as used on the cast film was used to measure the stretched film. The basal width after stretch (BW') was measured by microscopy cross-sectioning to be 22 microns and the peak height after stretch (P') was measured to be 8.5 microns. The final thickness of the film (T'), including the structured height, was calculated to be about 220 microns. The indices of refraction were measured on the backside of the stretched film using a Metricon Prism Coupler as available from Metricon, Piscataway, N.J., at a wavelength of 632.8 nm. The indices along the first in-plane (along the prisms), second in-plane (across the prisms) and in the thickness direction were measured to be 1.790, 1.577 and 1.554 respectively. The relative birefringence in the cross-sectional plane of this stretched material was thus 0.10.

Using the profilometry data, the ratio of the apparent cross-sectional areas provide a measured estimate of the stretch ratio of 6.4, uncorrected for density changes upon stretching and orientation. Using this value of 6.4 for the stretch ratio and the profilometry data, the shape retention parameter was calculated to be 0.94.

Example 5

A co-polymer (so-called 40/60 coPEN) comprising 40 mol % polyethylene terephthalate (PET) and 60 mol % polyethylene naphthalate character, as determined by the carboxylate (terephthalate and naphthalate) moiety (sub-unit) ratios, was made in a reactor vessel. The inherent viscosity (I.V.) was about 0.5.

The 40/60 coPEN resin pellets were dried to remove residual water and loaded into the extrusion hopper under a nitrogen purge. The 40/60 coPEN was extruded with a decreasing temperature profile of 285° C. to 277° C. within the extruder and the continuing melt train through to the die set at 288° C. Melt train pressures were continuously monitored and an average taken at the final monitored position along the melt train prior to bringing the die into close proximity to the tool onto which the polymer film is formed simultaneously with the structuring of a first surface of that film against the tool.

The tool was a structured belt having the desired negative version of the structured surface formed on the cast film. The structured surface comprised a repeating and continuous series of isosceles right triangular prisms, with basal widths (BW) of 50 microns and height (P) of nearly 25 microns. The basal vertices of the individual prisms were shared by their adjoining, neighboring structures. The prisms were aligned along the casting (MD) direction. The structured surface of the tool was coated with a fluorochemical benzotriazole having the formula

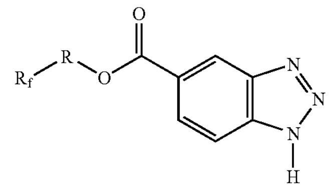

where $R_f$ is $C_4F_9$ and R is $-(CH_2)_6-$, as disclosed in U.S. Pat. No. 6,376,065. The tool was mounted on a temperature-controlled rotating can which provides a continuous motion of the tool surface along the casting (MD) direction. The measured surface temperature of the tool averaged 102° C.

The die orifice through which the molten polymer exits the melt train was brought into close proximity with the rotating belt tool forming a final slot between the tool and die. The pressure at the final monitored position along the melt train increased as the die and tool became closer. The difference between this final pressure and the previously recorded pressure is referred to as the slot pressure drop. The slot pressure drop in this example was $4.23\times10^6$ Pa (614 psi) providing sufficient pressure to drive the molten polymer into the structured cavities formed by the tool negative. The film thereby formed and structured, was conveyed by the tool rotation from the slot, quenched with additional air cooling, stripped from the tool and wound into a roll. Including the height of the structures, the total thickness of the cast film (T) was about 560 microns.

The cast and wound polymer film closely replicated the tool structure. Using contact profilometry, (e.g. a KLA-Tencor P-10 with a 60° 2 micron radius stylus), a clear, reasonably sharp prismatic structure was identified on the surface of the film. The measured profile exhibited the expected, nearly right triangular form with straight edges and a slightly rounded apex. The replicated prisms on the polymeric film surface were measured to have a basal width (BW) of 49.9 microns and a height (P) of 23.5 microns. The peak-to-peak spacing (PS) was approximately the same as the basal width (BW). The profilometry is limited to about a micron in resolution due to the shape and size of the stylus probe and the actual apex may be considerably higher. The tool is also imperfect and small deviations from nominal sizing can exist. To better characterize the actual extent of fill, e.g. characterize the precision of replication with the tool, the profilometry cross-section was fit to a triangle. Using data from the measured profile, the edges were fit as straight lines along the legs of the cross-section between 5 and 15 micron height as measured from the base. An ideal apex height of 24.6 microns with an included apex angle of 91.1° was calculated. A ratio of the profile-measured cross-sectional area to the ideal calculated cross-sectional area provided a calculated fill of 98.0%.

The structured cast film was stretched in a nearly truly uniaxial manner along the continuous length direction of the prisms. Using a laboratory stretcher. The film was preheated to 103° C. for 60 seconds and stretched at this temperature over 20 seconds at a uniform speed (edge separation) to a final stretch ratio of about 6. The structured surfaces maintained a prismatic shape with reasonably straight cross-sectional edges (reasonably flat facets) and approximately similar shape. The indices of refraction were measured on the backside of the stretched film using a Metricon Prism Coupler as available from Metricon, Piscataway, N.J., at a wavelength of 632.8 nm. The indices along the first in-plane (along the prisms), second in-plane (across the prisms) and in the thickness direction were measured to be 1.758, 1.553 and 1.551 respectively. The relative birefringence in the cross-sectional plane of this stretched material was thus 0.0097.

Example 6

A multilayer optical film made according to the procedures as described in examples 1-4 of U.S. Patent Application Publication 2004/0227994 A1 was cast and the protective polypropylene skin layer removed. The low index polymer used was a co-PET.

The multilayer optical film was cut into a sheet and dried in an oven at 60° C. for a minimum of 2 hours. The platens were heated to 115° C. The film was stacked in a construction of layers in the order: cardboard sheet, chrome plated brass plates (approx 3 mm thick), release liner, nickel microstructure tool, multilayer optical film, release liner, chrome plated brass plate (approx 3 mm thick), and cardboard sheet. The construction was placed between the platens and closed. A pressure of $1.38\times10^5$ Pa (20 psi) was maintained for 60 seconds.

The structured surface of the nickel microstructure tool comprised a repeating and continuous series of triangular prisms, with a 90° apex angle, basal widths (BW) of 10 microns and a height (P) of about 5 microns. The basal vertices of the individual prisms were shared by their adjoining, neighboring structures.

The embossed sheets were cut to an aspect ratio of 10:7 (along to across the grooves). The structured multilayer optical film was stretched in a nearly truly uniaxial manner along the continuous length direction of the prisms using a batch tenter process. The film was preheated to nearly 100° C., stretched to a stretch ratio around 6 over about 20 seconds, and then the stretching was reduced by about 10% while still in the tenter at stretch temperature, to control shrinkage in the film. The final thickness of the film (T'), including the structured height, was measured to be 150 microns. The indices of refraction were measured on the backside of the stretched film using a Metricon Prism Coupler as available from Metricon, Piscataway, N.J., at a wavelength of 632.8 nm. The indices along the first in-plane (along the prisms), second in-plane (across the prisms) and in the thickness direction were measured to be 1.699, 1.537 and 1.534 respectively. The birefringence in the cross-sectional plane of this stretched material was thus 0.018.

Example 7

An oriented, microreplicated structure was constructed as follows: 90° prismatic grooves at 125 micron pitch were embossed into an 0.010 inch thick film of cast PEN (polyether naphalate) by compression molding at 125C for 4 minutes. The tool structured film was quenched in an icewater. After removal and drying of the film, the film was then uniaxially stretched 5× along the long axis of the grooves at 128C. This resulted in transverse shrinkage of 5%, yielding a final pitch of approximately 62 microns. The refractive index was measured to be 1.84 along the oriented axis and 1.53 in the transverse direction. The indices of refraction were measured on the flat backside of the film using a Metricon Prism Coupler at a wavelength of 632.8 nm.

A piece of the oriented microstructured film was subsequently adhered to a glass microscope slide with the structured surface facing the slide using a UV curable acrylate resin with an isotropic refractive index 1.593. The acrylate resin was cured by multiple passes through the UV chamber—3 times on each side to ensure full cure of the resin.

A Helium-Neon laser beam was passed through the slide mounted oriented structured film. The HeNe laser was cleaned to a uniform linear polarization by passing through a Glan-Thompson polarizer. The ordinary-ray (o-ray) passed through the structure with only a small degree of splitting, where the half angle of the zeroth order divergence was found to be approximately 2°. A half-wave plate was then inserted immediately after the Glan-Thompson in order to rotate the laser beam 90° to the orthogonal polarization (e-ray). The zeroth order beam showed a divergence half angle of approximately 8°, or 4× the divergence of the o-ray.

Example 8

Figure 17:
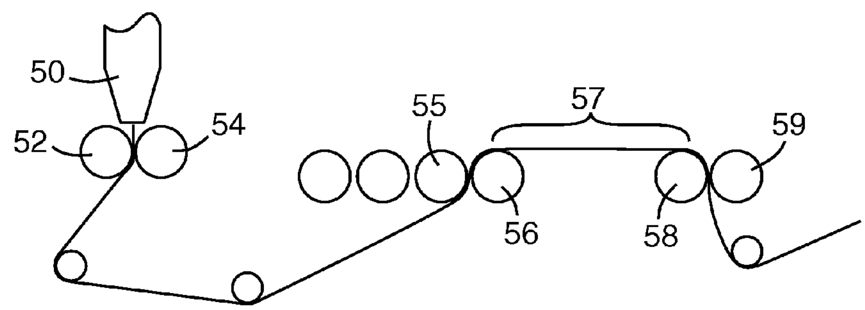
FIG. 17 is a schematic representation of a process according to the present invention.
Figure 18:
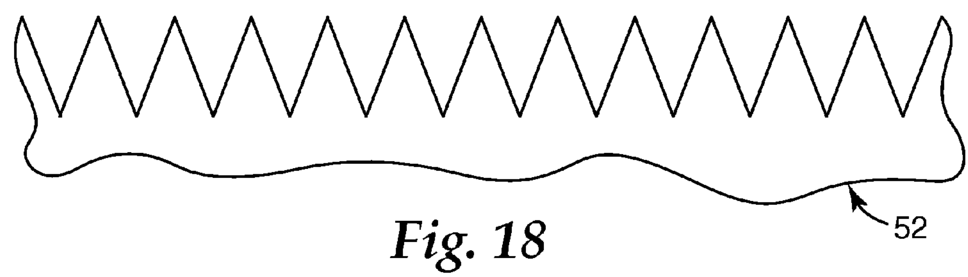
FIG. 18 is a representation of a portion of a surface of a micro grooved tool used for forming the film of the present invention as disclosed in Example 8.
Figure 19:
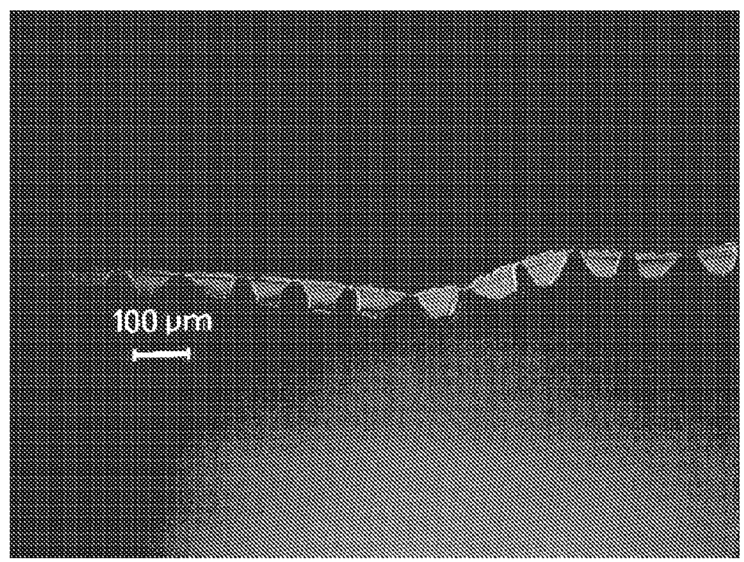
FIG. 19 is a photograph of a lateral section taken through a film article of the present invention, as disclosed in Example 8.

A filter according to the invention was made from a polymer film that was melt-cast onto a micro-grooved tool, length oriented, fibrillated, and electret charged. The film was cast and length oriented in a continuous process, depicted generally in FIG. 17, employing standard extrusion techniques using a 400 melt index polypropylene homopolymer resin, type 3505 from Exxon Co (now ExxonMobil Chemical Co., Houston, Tex.). Molten resin at a temperature of approximately 188° C. was delivered from an extruder 50 to the nip formed between a micro-grooved pattern roll or tool 52 and a rubber nip roll 54. Temperature of the micro-grooved tool 52 was maintained at approximately 52° C. with the cooperating rubber nip roll 54 maintained at approximately 27° C. The nip force between the tool 52 and rubber nip roll 54 was maintained at 29 N/cm. The film path continued past heated rolls 55 and 56, draw zone 57 and rubber nip roll 58 and associated drive roll 59. The draw ratio, amount of elongation of the film based on the ratio of the surface speeds of the tool and the final winding roll (drive roll 59), was four to one. The micro-grooved tool 52 had continuous, circumferentially aligned, "V" shaped grooves disposed on its surface, with features like that shown in FIG. 18. The grooves on the tool abutted one another across the face of the tool and had a depth of 165 μm with peak-to-peak spacing of 120 μm and an angle forming the groove of 40°. The film produced had a basis weight of 22.1 g/m$^2$ and a total thickness of 81 μm. Features on the surface of the film were approximately 50 μm in height. FIG. 19 is an illustrative photo of a sample of the stretched film made as described above.

Figure 20:
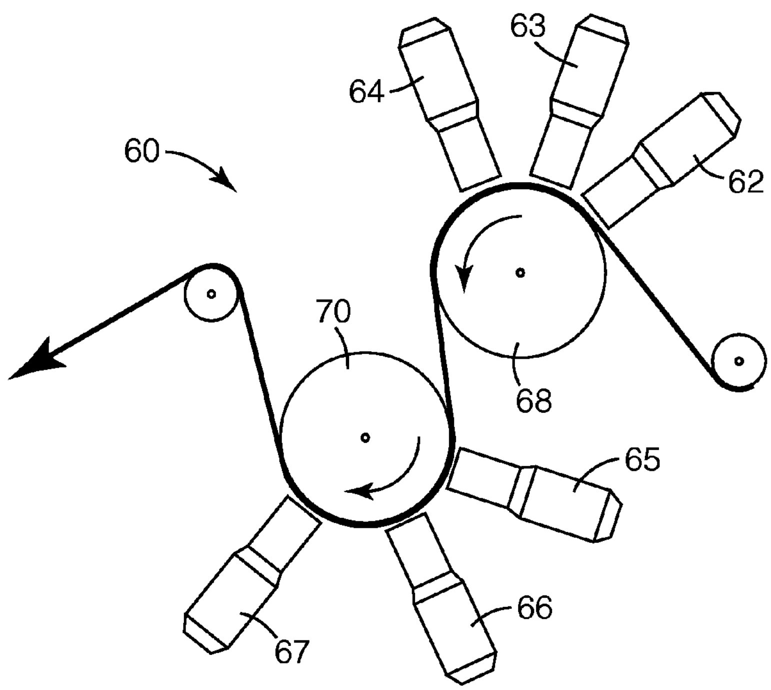
FIG. 20 is a schematic representation of a hydroentangler for use in fibrillating a film of the present invention.

The film formed in the first extrusion step was fibrillated using a hydroentangler 60 (FIG. 20), in this case exemplified by Hydrolace 350 System, available from CEL International LTD., Coventry, England. A hydroentangler is a device that uses high-pressure water jets to impinge on and entangle fibrous webs. In this application the hydroentangler was employed to separate features of the film into individual strands or bundles of strands. Prior to fibrillation, two lengths of film were layered, one placed on top of one another, and passed through the hydroentangler with their microstructure features aligned in the machine direction of the hydroentangler. The two film layers were fixed together at their ends with adhesive tape and passed under a succession of six jet-strips 62, 63, 64, 65, 66 and 67 that were directed towards, and 2.54 cm above, perforated conveyor drums 68 and 70 as is indicated in FIG. 20. The conveyor speed of the hydroentangler 60 was maintained at a rate of 5 m/min. Each jet-strip had a line of evenly spaced jet holes, 15.75 holes/cm, with each hole having a diameter of 120 microns. The first jet-strip 62 was operated at a water pressure of 5 mega Pascal (MPa), while the second through sixth jet strips, indicated as jet strips 63, 64, 65, 66 and 67, were operated at 7.5 MPa, 10 MPa, 5 MPa, 7.5 MPa, and 10 Mpa, respectively. After passing through the hydroentangler the film segments were allowed to air dry prior to electret charging.

With the ends of the fibrillated film layers fixed with adhesive tape the film was electret charged using a DC corona discharge device. The film was electret charged by exposure to a high voltage field in a method generally described in U.S. Pat. No. 3,998,916 (van Turnhout). The film was placed in contact with an aluminum ground plane, and then passed twice under an electrically positive 25 kV DC corona source, in air, at a rate of about 1.77 meters/min, while maintaining a current to ground plane of about 0.017 mA/cm of corona source length. The distance from corona source to ground was about 4 cm. The electret charged film was then formed into a filter bed of fibrils and tested for filter performance.

The charged film was formed into a bed of fibrils by cutting the electret charged fibrillated film into five to six centimeter long segments and mixing by hand to form a 2.67 gram mass of fibrils. The fibril mass was then formed by hand into the shape of a cylindrical filter bed, 11.4 cm in diameter and 0.6 cm deep. This fiber bed was placed in a test fixture and exposed to a particle challenge and evaluated for particle capture efficiency and pressure drop as outlined in the National Institute for Occupational Safety and Health (NIOSH) standard and described in United States Code of Federal Regulations, 42CFR84. Using a model 8127 automatic filter tester from TSI Incorporated, St. Paul Minn., an initial particle penetration was determined by forcing 0.3 micrometer diameter dioctyl phthalate (DOP) particles at a concentration of 103 mg/m$^3$ (generated using a TSI No. 212 sprayer with four orifices and 207 kPa aerosol pressure, 50 L/min dilution air, and neutralizer on) through the filter bed at a rate of 42.5 L/min (a face velocity of 6.9 centimeters per second). The sample was exposed to the DOP aerosol for 30 seconds until the readings stabilized. Particle penetration was measured at 47% with a pressure drop of just 1.95 Pa (0.2 mm$H_2O$). DOP penetration and pressure drop were used to calculate a filter quality factor, Q, from the natural log (ln) of the DOP penetration using the following formula:

$$Q[1/\text{mm H}_2\text{O}] = \frac{-\text{Ln}\frac{DOPPenetration(\%)}{100}}{PressureDrop[\text{mm H}_2\text{O}]}$$

The quality factor for the web tested was 3.8; quality factors greater than 2 are generally accepted to represent efficient filters.

Example 9

Figure 21:
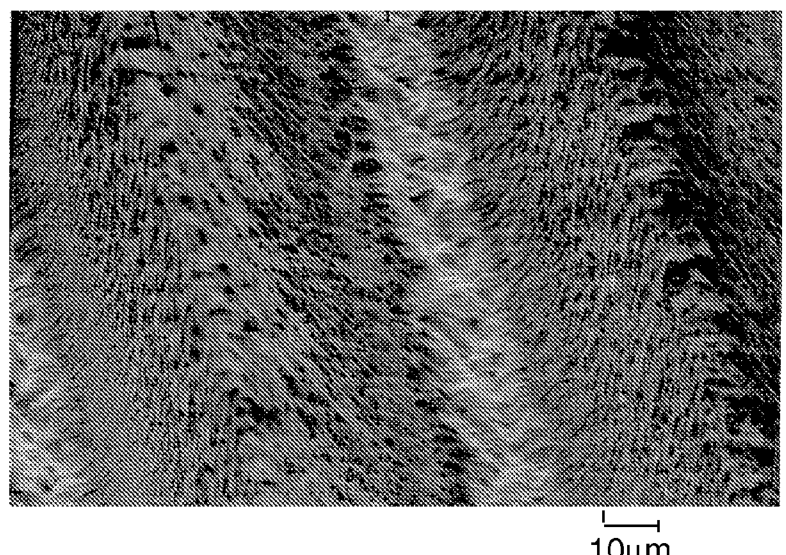
FIG. 21 is a photograph of a surface of a film of the present invention in a from according to Example 9.

A film according to the invention was produced. The film comprised a phase-separated film that had been embossed with linear features and then biaxially stretched to both elongate the feature and cause the film to become microporous. A microporous precursor (unstretched) film, formed in the manner generally described in U.S. Pat. No. 4,539,256 (Shipman), was made using a melt-blended composition of homopolymer polypropylene and mineral oil. The unstretched phase-separated film was produced from a 46:54 blend of mineral oil (80 centistokes viscosity) and polypropylene (0.8 melt flow index). Two layers of the film were embossed with a micro-grooved tool in a hydraulic press heated to 155° C. at a pressure of 574 kPa for 30 seconds. The tool had linear grooves that abutted each other running along the length of one surface of a 12.7 cm×30.5 cm plate. The grooves on the master tool had a depth of 92.9 μm with peak-to-peak spacing of 67.8 μm and an angle forming the groove of 45°. The groove was tilted 17.5° from normal. The embossed film was then placed in a small tentering frame and stretched to 1.5 times its width (perpendicular to the features) and two times its width (parallel to the features). The resulting microstructured-microporous film was observed microscopically to have microporous structure throughout the film including the features, as is evident in FIG. 21. Films of this type might find use in filtration, fuel cell, or apparel applications where having an integral feature in the microporous film would be beneficial.

Example 10

Crystallinity Index Method

Crystallinity index was determined using transmission geometry data collected in the form of survey scans through use of a Bruker GADDS Microdiffractometer (available from Bruker AXS Inc. of Madison, Wis.), CuK$_\alpha$ radiation source, and HiStar 2D position sensitive detector registry of the scattered radiation. Samples were positioned so as to place the lengthwise dimension in the vertical plane of the diffractometer. The diffractometer was fitted with pinhole collimation that used a 300 micron aperture and graphite incident beam monochromator. The detector was centered at 0 degrees (2θ), and no sample tilt was employed. Data were accumulated for 15 minutes at a sample to detector distance of 6 cm. X-ray generator settings of 50 kV and 100 mA were employed; values of crystallinity were reported as an index of the percent crystallinity. Two-dimensional data were radially summed to produce a conventional 1D diffraction pattern. The resulting pattern was subjected to profile fitting using the program ORIGIN (Origin Lab Co., Northhampton, Mass.) to separate amorphous and crystalline polymer scattering components.

For profile fitting, a parabolic background model and a Gaussian peak shape model were employed. Crystallinity index was evaluated as the ratio of crystalline scattering above background to total amorphous and crystalline scattering above background within the 10 to 35 degrees (2θ) scattering angle range.

Example 10b

Figure 22:
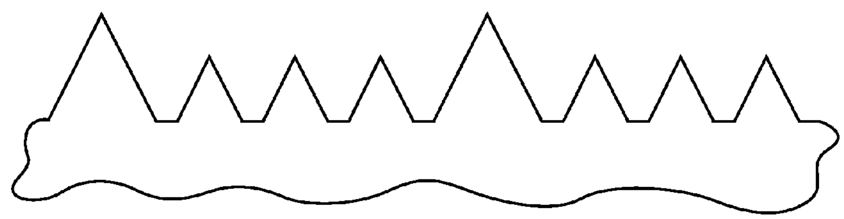
FIG. 22 illustrates a portion of a surface of a micro grooved tool used for forming the film of the present invention as disclosed in Example 10.
Figure 23:
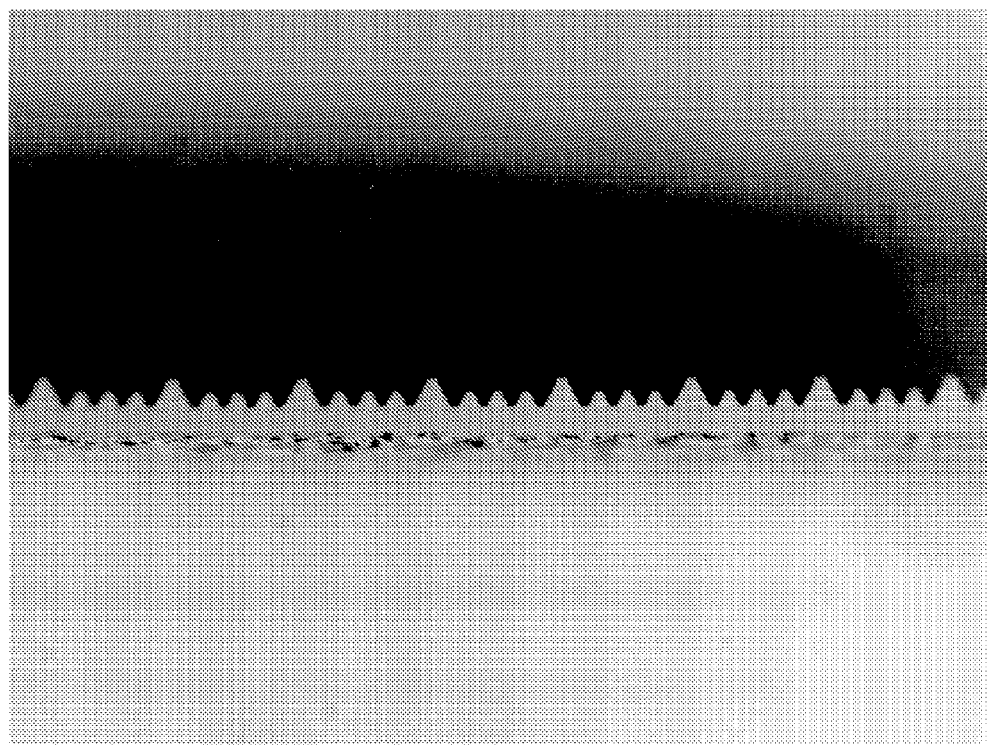
FIG. 23 is a photograph of a lateral section taken through a film article of the present invention, as disclosed in Example 10.

A microstructured and drawn film of the invention was made from a polymer that was melt-cast onto a micro-grooved master tool and length oriented. The microreplicated film was produced by extruding polymer into a nip, with one surface being formed from the metal tool and the other surface being formed from a flat silicone rubber belt surface. The film was cast in a continuous process employing standard extrusion techniques using a 9.0 melt index polypropylene homopolymer resin, type 3576X from Total Petrochemicals USA, Houston, Tex. Molten resin at a temperature of approximately 229° C. was delivered to the nip formed between a micro-grooved master tool and a rubber belt. The temperature of the micro-grooved casting roll was maintained at approximately 60° C. with the cooperating rubber belt maintained with a surface temperature of 171-177° C. The nip force between the casting roll and rubber belt was maintained at 80.8 N/cm. The micro-grooved master tool had continuous, circumferentially aligned, "V" shaped grooves disposed on its surface, with features like that shown in FIG. 22. The grooves on the master tool had larger features having a depth of 66 μm with peak-to-peak spacing of 236 μm and an angle forming the groove of 54°. The smaller features had a depth of 39 μm with peak-to-peak spacing of 52 μm and an angle forming the groove of 54°. The film produced had a basis weight of 60.7 g/m$^2$ and a total thickness of 106 μm. The separation span between adjacent features was 13 μm. Features on the surface of the film, shown in FIG. 23, followed the form of the master tool and had a height of 49 μm for the larger features and 30 μm for the small features with a land thickness of 57 um.

A film sample was uniaxially drawn, using a Karo IV Laboratory drawing machine, available from Brückner ServTec, Siegsdorf, Germany. The film sample was cut into a 100 mm×100 mm square, and drawn along the axis of the microstructure features. After equilibrating to a temperature of 150° C. the film sample was draw at a rate of 3.5 m/min to length five times their original length resulting in draw ratio of 5:1. The sample was then subjected to x-ray crystallography analysis to determine the degree of crystallinity, result are given in Table 1.

Comparative Example 10b

A drawn and then microstructured film was produced and tested as described in Example 1b except that the microstructured features were applied to the film after it had been drawn. Using the same material as described in Example 10b, the film of the comparative was produced by extruding a thin molten sheet between a smooth metal casting roll and a smooth rubber roll. Molten resin at a temperature of approximately 294° C. was delivered to the nip formed between the smooth metal roll, and smooth rubber roll. The metal casting roll was maintained at a temperature of 22° C., while the cooperating rubber roll was cooled using 14° C. water. The surface temperature of the rubber roll was not measured but was appreciable higher than the temperature of the cooling water. The nip force between the casting roll and rubber belt was maintained at 169 N/cm. The resultant film had a nominal thickness of 70 μm and a basis weight of 59 g/m$^2$. A sample of the film was taken and drawn as described in Example 10b. The drawn sample was then micro-machined on one surface using a diamond-tipped tool. Features of the same general configuration and orientation to the draw direction, as the drawn film produced in Example 10b, were cut into the film. To machine the film, a section was mounted on a precision turning drum, the drum was rotated at a surface speed of 31.7 m/min and the diamond tip brought to contact the film. The 90° sharp-tip diamond tool was plunged into the film to produce abutting channels that were 12-15 um um deep. A Model SS-156 tooling machine, from Pneumo Precision Products Inc. was used to machine the film (Pneumo Precision Products Inc. became the Pneuma ultra-precision machine tool division of Taylor Hobson (formerly Rank Taylor Hobson/Rank Pneumo), and has since merged into Precitech, Inc., Keene, N.H.). The sample was then subjected to x-ray crystallography analysis to determine the degree of crystallinity, result are given in Table 1.

TABLE 1

| | Example | |
|---|---|---|
| | 10b | C10b |
| Crystallinity Index | 0.35 | 0.29 |

Results: As is illustrated by the crystallinity index the inventive film retained a desirably greater crystalline level than the comparative film, even though both films were drawn to an equivalent degree and had similar microstructure features. The results indicate that the crystalline morphology of the microstructure features is retained for the inventive film but lost in the comparative film, where the microstructure features are formed into the film after drawing. Higher degree of crystallinity results in desirable mechanical and optical properties.

What is claimed is:

1. A method of making fibers comprising:
forming a polymeric film having
a body having a first surface and a second surface and having a longitudinal dimension, and
a plurality of elongate microstructured surface features disposed on the first surface of the body in a direction substantially parallel to the longitudinal dimension of the body, wherein the microstructured surface features are substantially parallel;
stretching the polymeric film in a direction substantially parallel to the longitudinal dimension of the body; and
separating the stretched polymeric film along generally longitudinally disposed separation lines to define a plurality of discrete fiber elements, wherein one or more of the fiber elements have at least one microstructured surface feature thereon.

2. The method of claim 1, and further comprising:
exposing the polymeric film to an electric field.

3. The method of claim 2 wherein the exposing step defines the film as an electret.

4. The method of claim 3, wherein the forming step further comprises:
defining the shape of at least one of the microstructure features to enhance electrical field effects.

5. The method of claim 2 wherein the exposing step precedes the stretching step.

6. The method of claim 2 wherein the stretching step precedes the exposing step.

7. The method of claim 1, wherein the body has a first thickness and the microstructure features have a second thickness, and wherein after stretching, the ratio of the first thickness to the second thickness is at most 2.

8. The method of claim 1 wherein the forming step further comprises:

defining the longitudinal separation lines on the polymeric film.

9. The method of claim 1, and further comprising:

laterally cutting the fiber elements;

mixing the cut fiber elements; and forming a filtration layer of mixed fiber elements.

10. The method of claim 1 wherein at least one microstructure feature is continuous along the first surface of the body.

11. The method of claim 1 wherein at least one microstructure feature is discontinuous along the first surface of the body.

12. The method of claim 1 wherein at least two adjacent microstructure features are spaced apart laterally by a separation span of the body.

13. The method of claim 12 wherein at least one of the separation lines extends within one of the separation spans and is spaced laterally from the microstructure features on each side of that separation span.

14. The method of claim 1 wherein at least one of the fiber elements has a plurality of microstructure features thereon.

15. The method of claim 1 wherein at least one microstructure feature has a discontinuity.

16. The method of claim 1 wherein at least one microstructure feature has a plurality of discontinuities.

17. The method of claim 1, wherein the forming step further comprises:

defining at least one generally laterally disposed lateral separation line across the longitudinal dimension of the body; and separating each fiber element into one or more fiber element segments.

18. The method of claim 17 wherein the film separating and fiber element separating steps occur simultaneously.

19. The method of claim 1, and further comprising:

maintaining the plurality of discrete fiber elements in an array having a substantially parallel fiber element alignment.

20. A method of making fibers comprising:

forming a polymeric film having a body having a first surface and a second surface and having a longitudinal dimension, and a plurality of elongate microstructured surface features disposed on the first surface of the body in a direction substantially parallel to the longitudinal dimension of the body, wherein the elongate microstructured surface features are substantially parallel;

stretching the polymeric film in a direction substantially parallel to the longitudinal dimension of the body; and fibrillating the stretched polymeric film along the longitudinal dimension of the body to provide one or more fibers, wherein each fiber has at least one microstructured surface feature thereon.

21. The method of claim 20, and further comprising:

exposing the polymeric film to an electric field.

22. The method of claim 21 wherein the exposing step defines the film as an electret.

23. The method of claim 22, wherein the forming step further comprises:

defining the shape of at least one of the microstructure features to enhance electrical field effects.

24. The method of claim 21 wherein the exposing step precedes the fibrillating step.

25. The method of claim 21 wherein the fibrillating step precedes the exposing step.

26. The method of claim 20, wherein the body has a first thickness and the microstructure features have a second thickness, and wherein after stretching, the ratio of the first thickness to the second thickness is at most 2.

27. The method of claim 20 wherein the fibrillating step separates the stretched polymeric film into fibers along generally longitudinal separation lines, and wherein the forming step further comprises:

defining the longitudinal separation lines on the polymeric film.

28. The method of claim 20, and further comprising:

laterally cutting the fibers;

mixing the cut fibers; and forming a filtration layer of mixed fibers.

29. The method of claim 20 wherein at least one microstructure feature is continuous along the first surface of the body.

30. The method of claim 20 wherein at least one microstructure feature is discontinuous along the first surface of the body.

31. The method of claim 20 wherein the fibrillating step separates the stretched polymeric film into fibers along generally longitudinal separation lines, and wherein at least some adjacent microstructure features are spaced apart laterally by a separation span of the body.

32. The method of claim 31 wherein at least one of the separation lines extends within one of the separation spans and is spaced laterally from the microstructure features on each side of that separation span.

33. The method of claim 20 wherein at least one of the fibers has a plurality of microstructure features thereon.

34. The method of claim 20 wherein at least one microstructure feature has a discontinuity.

35. The method of claim 20 wherein at least one microstructure feature has a plurality of discontinuities.

36. The method of claim 20, wherein the forming step further comprises:

defining at least one generally laterally disposed lateral separation line across the longitudinal dimension of the body; and separating each fiber into one or more fiber segments.

37. The method of claim 36 wherein the fibrillating and fiber separating steps occur simultaneously.

38. The method of claim 20, and further comprising:

maintaining the fibers in an array having a substantially parallel fiber alignment.

* * * * *

UNITED STATES PATENT AND TRADEMARK OFFICE

CERTIFICATE OF CORRECTION

PATENT NO. : 9,134,471 B2
APPLICATION NO. : 11/427149
DATED : September 15, 2015
INVENTOR(S) : Raymond Johnston et al.

It is certified that error appears in the above-identified patent and that said Letters Patent is hereby corrected as shown below:

IN THE SPECIFICATION

Column 3
Line 25, delete “from” and insert -- form --

Column 4
Line 10, delete “thereof” and insert -- thereof, --

Line 21, delete “thereof” and insert -- thereof, --

Column 8
Line 55, delete “(Pt).” and insert -- (P'). --

Column 10
Line 39, delete “prismatic)” and insert -- (prismatic) --

Line 45, delete “411” and insert -- 4B --

Column 12
Line 38, delete “90'” and insert -- 90° --

Column 14
Line 44, delete “tool” and insert -- tool. --

Column 19
Line 2, delete “electete” and insert -- electret --

Line 40, delete “copolymers,” and insert -- copolymers; --

Signed and Sealed this
Twenty-second Day of March, 2016

Michelle K. Lee
*Director of the United States Patent and Trademark Office*

IN THE SPECIFICATION

Column 20
Line 21, delete “bibenzoic” and insert -- bisbenzoic --

Line 40, delete “pheneanthrene,” and insert -- phenanthrene, --

Column 23
Line 60, delete “therein,” and insert -- therein. --

Column 27
Lines 5-6, delete “microparticlate” and insert -- microparticulate --

Column 28
Line 3, delete “benotriazole” and insert -- benzotriazole --

Column 29
Line 31, delete “benezotriazole” and insert -- benzotriazole --

Column 36
Lines 18-19, delete “(polyether naphalate)” and insert -- (polyethylene naphthalate) --

Column 37
Line 13, delete “Hydrolace” and insert -- Hydrolase --

Column 38
Line 66, delete “Northhampton,” and insert -- Northampton, --

Column 40
Line 11, delete “12-15 um um” and insert -- 12-15 um --